(12) United States Patent
Egawa

(10) Patent No.: US 11,024,990 B2
(45) Date of Patent: Jun. 1, 2021

(54) CONNECTOR ASSEMBLY FOR CONNECTING MULTIPLE CABLES TO ELECTRICAL DEVICE

(71) Applicant: Molex, LLC, Lisle, IL (US)

(72) Inventor: Toyokazu Egawa, Yamato (JP)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 16/693,391

(22) Filed: Nov. 25, 2019

(65) Prior Publication Data

US 2020/0176900 A1   Jun. 4, 2020

(30) Foreign Application Priority Data

Nov. 30, 2018 (JP) .............................. JP2018-224407
Sep. 30, 2019 (JP) .............................. JP2019-180258
Oct. 4, 2019 (JP) .............................. JP2019-183806

(51) Int. Cl.
| | |
|---|---|
| *H01R 9/24* | (2006.01) |
| *H01R 13/518* | (2006.01) |
| *H02G 3/16* | (2006.01) |
| *H01R 13/58* | (2006.01) |
| *H01R 13/6592* | (2011.01) |
| *H01R 12/58* | (2011.01) |
| *H01R 12/61* | (2011.01) |

(52) U.S. Cl.
CPC .......... *H01R 9/2416* (2013.01); *H01R 12/58* (2013.01); *H01R 12/61* (2013.01); *H01R 13/518* (2013.01); *H01R 13/5808* (2013.01); *H01R 13/6592* (2013.01); *H02G 3/16* (2013.01)

(58) Field of Classification Search
CPC .. H01R 9/2416; H01R 12/58; H01R 13/6215; H01R 13/621; H01R 13/639
USPC .................................... 439/541.5, 540.1, 701
See application file for complete search history.

(56) References Cited

U.S. PATENT DOCUMENTS

| | | | |
|---|---|---|---|
| 1,568,156 A | 1/1926 | Herskovitz | |
| 4,707,043 A * | 11/1987 | Reed ...................... | G01V 1/201 |
| | | | 439/142 |

(Continued)

FOREIGN PATENT DOCUMENTS

| | | |
|---|---|---|
| CN | 1759507 A | 4/2006 |
| CN | 1783611 A | 6/2006 |

(Continued)

OTHER PUBLICATIONS

Non-final office action received for U.S. Appl. No. 16/693,379 dated Sep. 1, 2020, 7 pages.

(Continued)

*Primary Examiner* — Peter G Leigh

(57) ABSTRACT

A connector is configured to mate with a second connector and a third connector. The connector includes a housing, terminals equipped in the housing that are configured to connect to third terminals provided in the third connector, and coupling terminals that can at least connect to a second terminal provided in the second connector. The terminals include an electric wire connecting part that is configured to connect to electric wires included in a cable connected to the housing and a contact part that is configured to make contact with the third terminals. The electric wire connecting part and contact part positions are offset with regard to a direction orthogonal to a mating direction.

4 Claims, 21 Drawing Sheets

(56) References Cited

U.S. PATENT DOCUMENTS

| | | | | |
|---|---|---|---|---|
| 4,820,179 | A | * | 4/1989 | Saijo ................ H01R 4/2466 439/224 |
| 4,917,625 | A | | 4/1990 | Haile |
| 5,124,876 | A | | 6/1992 | Misencik et al. |
| 5,190,475 | A | | 3/1993 | Dickens |
| 5,352,850 | A | * | 10/1994 | Norris ................ H02G 3/16 174/51 |
| 5,697,806 | A | | 12/1997 | Whiteman, Jr. et al. |
| D411,828 | S | | 7/1999 | Min |
| 6,475,036 | B2 | * | 11/2002 | Morikawa ......... H01R 13/6395 439/716 |
| 6,692,310 | B2 | * | 2/2004 | Zaderej ............ H01R 13/514 439/541.5 |
| 7,438,604 | B2 | * | 10/2008 | Andresen ........... H01R 4/4818 439/709 |
| 7,544,074 | B2 | * | 6/2009 | Buck ................. H01R 13/64 439/144 |
| 7,753,740 | B2 | * | 7/2010 | Carolis ............ H04L 12/40006 439/717 |
| 8,007,312 | B2 | * | 8/2011 | Bower ................ H01R 13/514 439/540.1 |
| 8,043,114 | B2 | * | 10/2011 | Kaneko ............. H01R 12/716 439/497 |
| 8,206,159 | B2 | * | 6/2012 | Naito ................ H01R 12/7082 439/65 |
| 9,048,569 | B2 | * | 6/2015 | Chen ................ H01R 13/6275 |
| 9,343,860 | B2 | * | 5/2016 | Zomchek ............ H01R 31/005 |
| 9,450,319 | B2 | * | 9/2016 | Nishimura ......... H01R 13/6273 |
| 10,143,102 | B2 | * | 11/2018 | Bury ................ H01R 9/2425 |
| D845,893 | S | | 4/2019 | Kim et al. |
| D850,381 | S | | 6/2019 | Tabata et al. |
| D892,728 | S | | 8/2020 | Pan |
| 2002/0197893 | A1 | | 12/2002 | Hiroyuki et al. |
| 2013/0217262 | A1 | | 8/2013 | Ikeda et al. |
| 2015/0340788 | A1 | | 11/2015 | Sakaue et al. |
| 2015/0357735 | A1 | | 12/2015 | Uratani |
| 2018/0037177 | A1 | * | 2/2018 | Dietrich ............ H02B 1/205 |
| 2020/0099168 | A1 | | 3/2020 | Inoue et al. |
| 2020/0176900 | A1 | | 6/2020 | Egawa |
| 2020/0194949 | A1 | | 6/2020 | Egawa |
| 2020/0212608 | A1 | | 7/2020 | Egawa |
| 2020/0251855 | A1 | | 8/2020 | Chen |

FOREIGN PATENT DOCUMENTS

| | | |
|---|---|---|
| CN | 201112707 Y | 9/2008 |
| CN | 202068039 U | 12/2011 |
| CN | 102403683 A | 4/2012 |
| CN | 203850506 U | 9/2014 |
| CN | 206412796 U | 8/2017 |
| JP | S54-41590 U | 3/1979 |
| JP | H06-52907 A | 2/1994 |
| JP | H08-115759 A | 5/1996 |
| JP | 3135006 B2 | 2/2001 |
| JP | 2010-252543 A | 11/2010 |
| TW | D156015 S1 | 9/2013 |
| TW | D187173 S1 | 12/2017 |
| TW | D188008 S | 1/2018 |
| TW | D189476 S | 4/2018 |
| TW | D189478 S | 4/2018 |

OTHER PUBLICATIONS

Non-final office action received for U.S. Appl. No. 16/693,388 dated Sep. 16, 2020, 6 pages.

Non-final office action received for U.S. Appl. No. 29/706,412 dated Oct. 6, 2020, 9 pages.

* cited by examiner

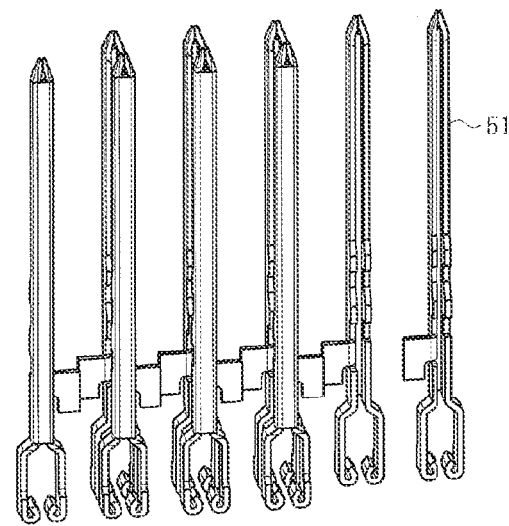

CONNECTOR ASSEMBLY FOR CONNECTING MULTIPLE CABLES TO ELECTRICAL DEVICE

RELATED APPLICATIONS

This application claims priority to Japanese Application No. 2018-224407, filed on Nov. 30, 2018, to Japanese Application No. 2019-180258, filed on Sep. 30, 2019, and to Japanese Application No. 2019-183806, filed on Oct. 4, 2019, each of which are incorporated herein by reference in their entirety.

TECHNICAL FIELD

The present disclosure relates to a connector.

BACKGROUND ART

Conventionally, a connection device for connecting two cables each having a plurality of conductors has been proposed (for example, see patent document 1).

FIG. 21 is a cross-sectional view illustrating the inside of a conventional connection device.

In the drawing, 811 is a housing for the connection device, and the termini of the two cables 891 are connected respectively into two wall surfaces of the housing 811 facing each other. In addition, the housing 811 is equipped with a connection block 821, and the connection block 821 holds a plurality of connection terminals 861. Furthermore, the plurality of conductive wires 892 in each of the cables 891 are connected to corresponding connection terminals 861. Therefore, the plurality of conductive wires 892 in the cables 891 are respectively connected to corresponding other conductive wires 892 of the cables 891.

Patent Document 1: Japanese Unexamined Patent Application Publication No. H6-52907.

SUMMARY

However, conventional connection devices only connect the conductive wires 892 of the two cables 891, and are not equipped with a function to connect the conductive wires 892 to any electrical devices, electronic devices, or the like.

Here, an objective is to resolve the conventional problems, and to provide a highly convenient connector that connects electric wires, which is a connector that can be connected to other connectors, connects electric wires to devices while having a simple configuration and a small size, and enables relaying.

Therefore, a connector assembly is made up of a first connector, a second connector, and a third connector, the second connector is connected to the end of electric wires, the third connector is mounted on devices, and the first connector is between the second connector and third connector and mated and connected to the second connector and third connector and divides the signals and electric power supplied from the electric wires. The first connector includes a first housing, first terminals equipped in the first housing, and coupling terminals equipped in the first housing. The first housing includes penetration holes extending in the mating direction. The third connector includes a third housing that is equipped with third terminals that are able to connect to the coupling terminals, and is secured to the casing of the device by mounting fixture. The second connector includes a second housing that is equipped with second terminals that are able to connect to the coupling terminals, and is formed with insertion holes that screw members can be inserted into. Screw members are inserted into the insertion hole and penetrate through the penetration holes and are screwed into the mounting fixture, and thus the second connector and third connector are mated and coupled.

The coupling terminals of another connector assembly include an upper connecting part that can be connected by insertion into a contact part of the second terminal and a lower connecting part that can be connected by insertion of the contact part of the third terminal.

The first housing for still another connector assembly can further be disassembled into an upper half and a lower half.

The first terminal of still another connector assembly connects to a first electric wire included in a cable connected to the first housing, and in plan view, the first cable connects obliquely to the first housing.

The first terminals of still another connector assembly are arranged so as to form a row extending in an oblique direction with respect to the first housing in plan view.

According to the present disclosure, a connector is connected to electric wires, can also be connected to another connector, and even while being small and having a simple configuration, enables connecting electric wires to devices as well as relaying, improving convenience.

DESCRIPTION OF DRAWINGS

FIG. 3A is a side view, and FIG. 3B is a top view.

FIG. 13A is a drawing right before the upper half of the first terminal holding member is mounted on the jumper pin, and FIG. 13B is a drawing showing the jumper pin.

FIG. 14A is a top view, and FIG. 14B is a cross-section view taken along the line B-B of FIG. 14A.

FIG. 20A is a perspective view, FIG. 20B is a front view, and FIG. 20C is a side view.

DETAILED DESCRIPTION OF THE PREFERRED EMBODIMENTS

An embodiment will be described in detail below with reference to the drawings.

Figure 1:
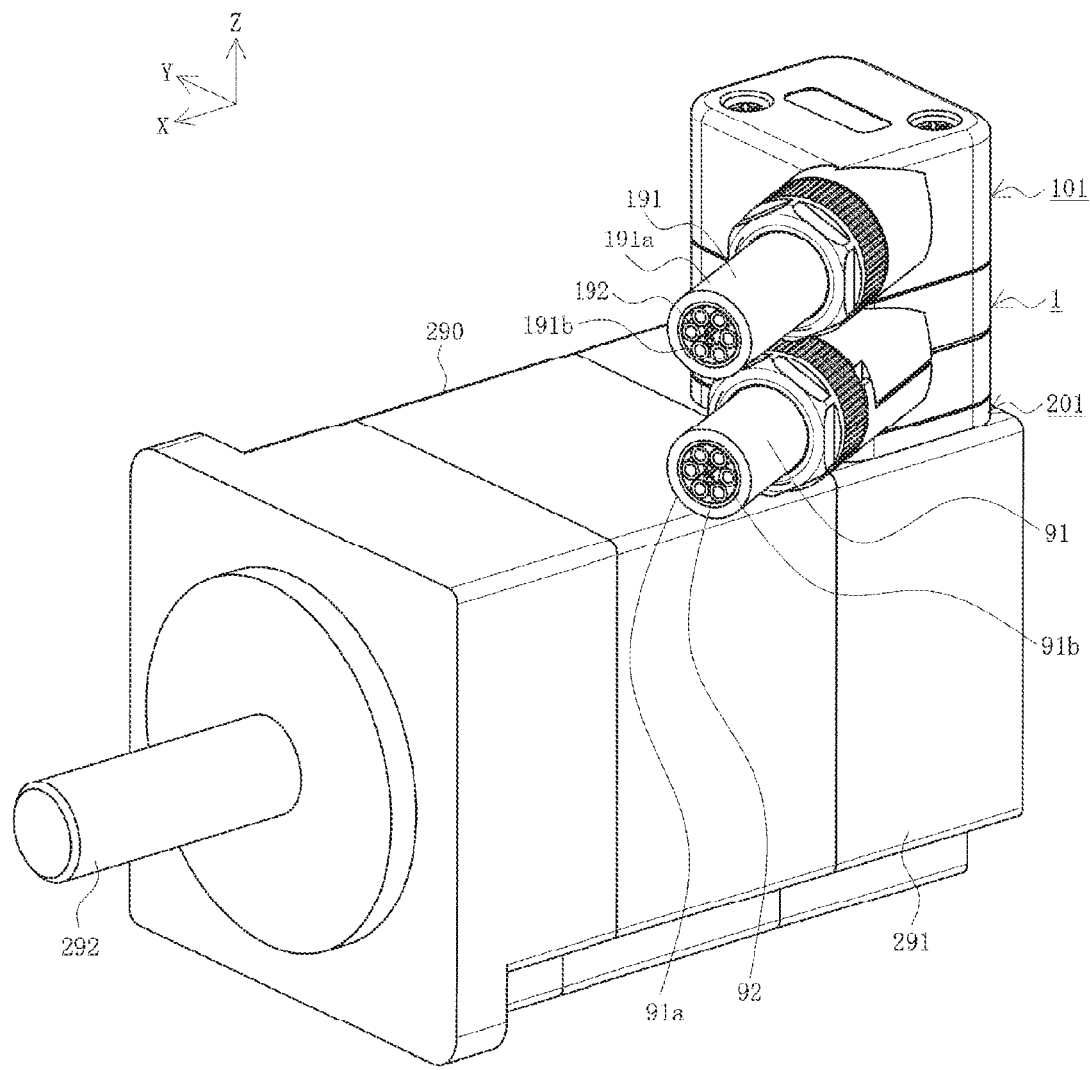
FIG. 1 is a perspective view showing a first connector and a second connector in a state mated to a third connector that is mounted on the casing of the present embodiment.
Figure 2:
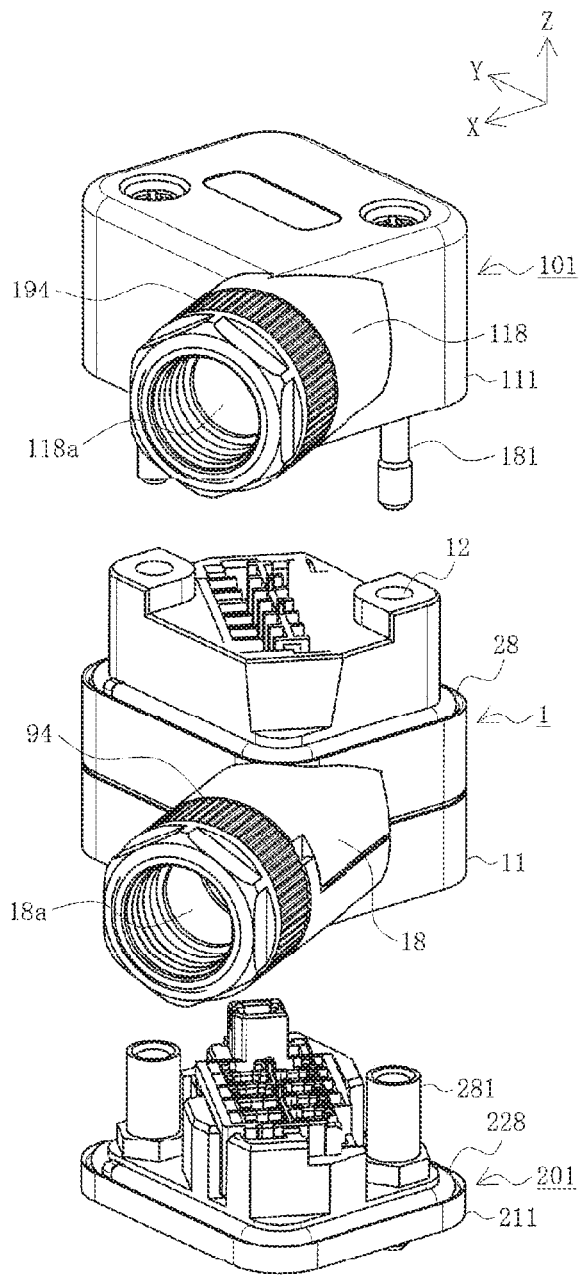
FIG. 2 is a perspective view showing the first connector, the second connector, and the third connector of the present embodiment in a state before mating.
Figure 3A:
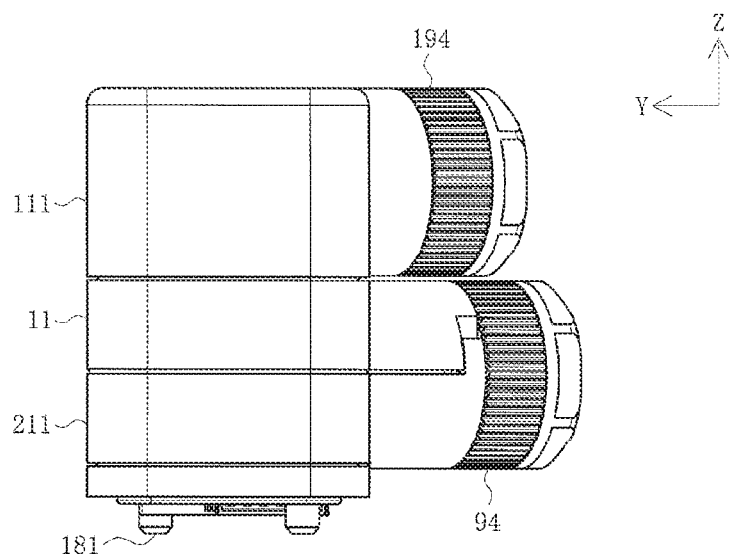
FIGS. 3A and 3B are two views showing the first connector, the second connector, and the third connector of the present embodiment in a mated state, where
Figure 3B:
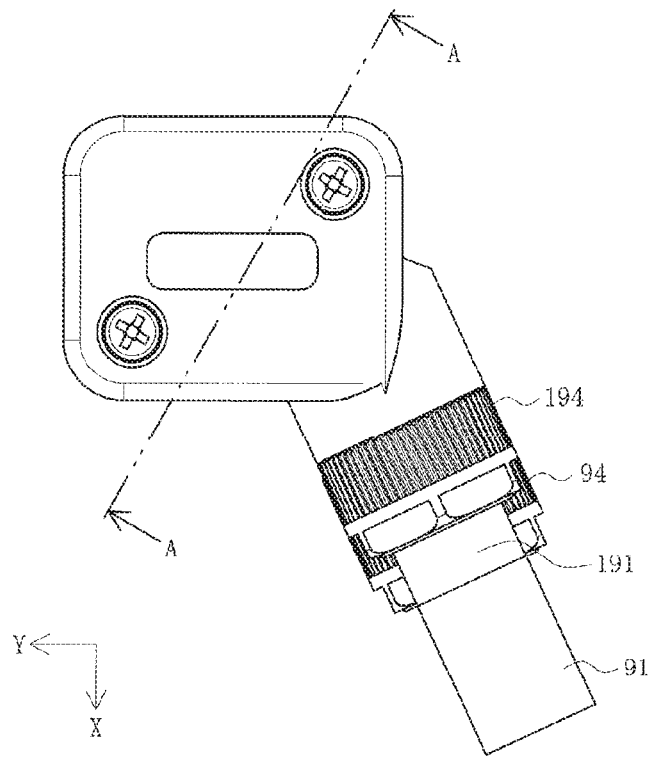
Figure 4:
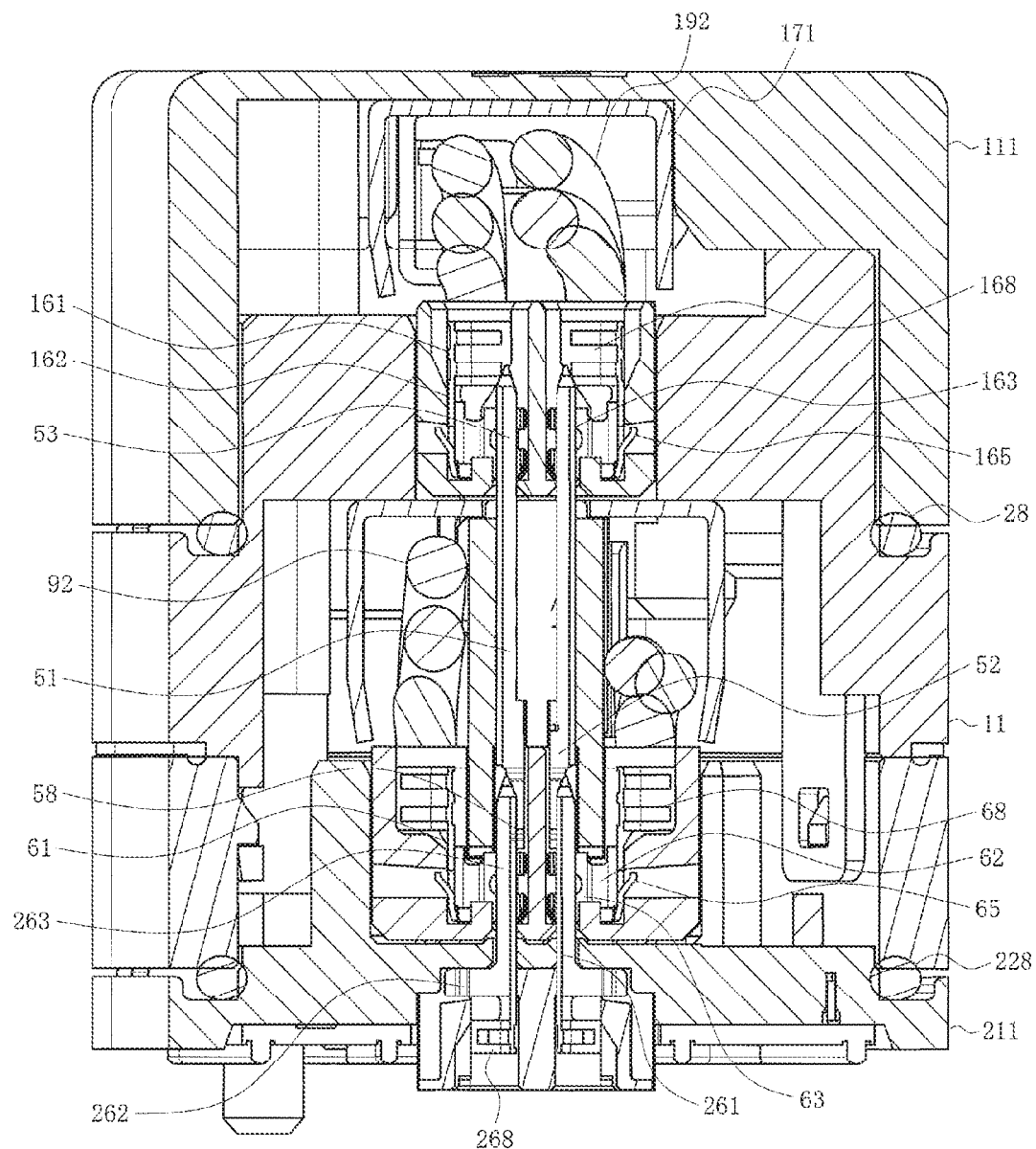
FIG. 4 is a cross-section view of the first connector, the second connector, and the third connector of the present embodiment in a mated state, and is a cross-section view taken along the line A-A in FIG. 3B.

FIG. 1 is a perspective view showing a first connector and a second connector in a mated state to a third connector that is mounted on a casing of the present embodiment. FIG. 2 is a perspective view showing the first connector, the second connector, and the third connector of the present embodiment in a state before mating. FIGS. 3A and 3B are two views showing the first connector, the second connector, and the third connector of the present embodiment in a mated state. FIG. 4 is a cross-section view of the first connector, the second connector, and the third connector of the present embodiment in a mated state, and is a cross-section view taken along the line A-A in FIG. 3B. Note that in FIG. 3A is a side view, and FIG. 3B is a top view.

In the drawings, 1 is a first connector which is the relay connector that is the connector in the present embodiment, and is a type of electric wire connector that terminates and connects a first cable 91 provided with a plurality of first electric wires 92. In addition, 101 is a second connector that is one counterpart connector of the present embodiment, and is a type of electric wire connector that terminates and connects a second cable 191 provided with a plurality of second electric wires 192. Furthermore, 201 is a third connector that is another counterpart connector of the present embodiment, and is a device side connector that is used mounted on a casing 291 of a device 290 that is some type of device 290 such as an electronic device, household device, medical equipment, industrial device, transport device, or the like. The casing 291 that is the outer member can be used for any application and can be the casing for any type of device, however, here, for the convenience of description, the casing is used as a member for a part of a cover covering a stepping motor with a rotating shaft 292.

Furthermore, regarding the present embodiment, expressions that indicate directions such as up, down, left, right, front, rear, and the like used to describe the configuration and operation of the first connector 1, the second connector 101, the third connector 201, and other various parts contained thereof, are not absolute and are relative, and are appropriate in the indicated position of the first connector 1, the second connector 101, the third connector 201, and various parts contained in other members in drawings, however, when the position of the first connector 1, the second connector 101, the third connector 201, and various parts contained in other members change, a description of changes according to the changes in position should be made.

As shown in the drawing, the casing 291 is a member with a substantially rectangular shape in the X-Y plane, and the third connector 201 is mounted on one corner of the rectangle. The third connector 201 is provided with a third housing 211 that is integrally formed by insulating materials such as synthetic resins and the like, a plurality of third terminals 261 made up of conductive metals equipped on the third housing 211, a pair of third mounting brackets 281 equipped on the third housing 211, and a lower cushioning member 228 made up of a flexible material such as rubber and the like mounted on the periphery of the third housing 211.

Furthermore, one end of a plurality of electric wires (not shown) is connected to a stepping motor, encoder, and the like stowed inside the casing 291 and the other end is connected to the electric wire connecting parts 268 of the third terminals 261. Each of the third terminals 261 are long and narrow members extending in the mating direction of the first connector 1, in other words the vertical direction (Z-axis direction), and include a main body part 262, an electric wire connecting part 268 connected to the lower end of the main body part 262, and a contact part 263 that extends upward from the upper end of the main body part 262.

In a state where the first connector 1, the second connector 101, and the third connector 201 are mated together, the contact parts 263 of the third terminals 261 make contact with contact parts 63 of the first terminals 61 that are the terminals for the first connector 1 positioned on the upper side as well as the lower contact parts 58 of jumper pins 51, as shown in FIG. 4. In addition, the lower cushioning member 228 is interposed between the third housing 211 and a first housing 11 that is the housing for the first connector 1 positioned on the upper side thereof, and functions as a sealing member that seals the gap between the third housing 211 and the first housing 11, and fully prevents any intrusion of external foreign substances such as dust and the like. Furthermore, the third mounting brackets 281 are coupled with the second mounting brackets 181 of the second connector 101 that pass through the first housing 11, and therefore, the first connector 1, second connector 101, and third connector 201 are fastened together in a mutually mated state, as shown in FIGS. 3 and 4.

The second connector 101 is provided with second housing 111 that is integrally formed using an insulating material such as synthetic resin and the like, a plurality of second terminals 161 made up of conductive metals equipped on the second housing 111, a pair of second mounting brackets 181 equipped on the second housing 111, and a second shield 171 equipped on the second housing 111. The second housing 111 is a substantially rectangular body that has a substantially rectangular shape in the X-Y plane, and includes a second cable connecting part 118 that protrudes from a corner of the rectangle in an inclined direction relative to the long side and short side of the rectangle. In addition, the terminus of a second cable 191 is stowed in an inner space part 118*a* of the second cable connecting part 118 and connected via a second pressing ring 194, and each of the second electric wires 192 that extend from the terminus of the second cable 191 go through the inner space part 118*a* and the inside of the second housing 111 and are connected with electric wire connecting parts 168 of the corresponding second terminals 161. Furthermore, the second cable 191 includes a second cable shield 191*b* made up of conductive metals such as a metal mesh and the like that is formed in a manner to surround the bundle of second electric wires 192, and a second cable exterior coating 191*a* integrally formed from an insulating material such as synthetic resin and the like in a manner of coating the exterior of the second cable shield 191*b*. The second terminals 161 include main body parts 162, the electric wire connecting parts 168 that are connected to the upper end of the main body parts 162, contact parts 163 that are connected to the main body parts 162, and locking protrusions 165 that are formed on the main body parts 162.

The first connector 1 is provided with the first housing 11 that is integrally formed using insulating materials such as synthetic resins and the like, the plurality of first terminals 61 made up of conductive metals equipped on the first housing 11, the plurality of jumper pins 51 as coupling terminals made up of conductive metals equipped on the first housing 11, and an upper cushioning member 28 made up of a flexible material such as rubber and the like mounted on the periphery of the first housing 11. The first housing 11 is a substantially rectangular body that has a substantially rectangular shape in the X-Y plane, and includes a first cable connecting part 18 that projects from a corner of the rectangle in an inclined direction relative to the long side and short side of the rectangle. In addition, the terminus of the first cable 91 is stowed in an inner space part 18*a* of the first cable connecting part 18 and connected via a first pressing ring 94, and each of the first electric wires 92 that extend from the terminus of the first cable 91 go through the inner space part 18*a* and the inside of the first housing 11 and are connected to the corresponding electric wire connecting parts 68 of the first terminals 61. The first electric wires 92 are crimped on the electric wire connecting parts 68 so as to be parallel with the mating direction. Furthermore, the first cable 91 includes a first cable shield 91*b* made up of conductive metals such as a metal mesh and the like that is formed in a manner to surround the bundle of first electric wires 92, and a first cable exterior coating 91*a* integrally formed from an insulating material such as synthetic resin and the like in a manner of coating the exterior of the first cable shield 91*b*. Moreover, a pair of mounting fitting penetration holes 12 are formed on the first housing 11 which the second mounting brackets 181 are inserted and pass through.

Figure 14A:
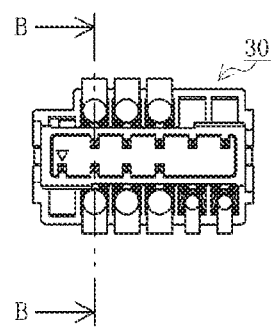
FIGS. 14A and 14B are two views of the first connector terminal jumper pin assembly of the present embodiment, where
Figure 14B:
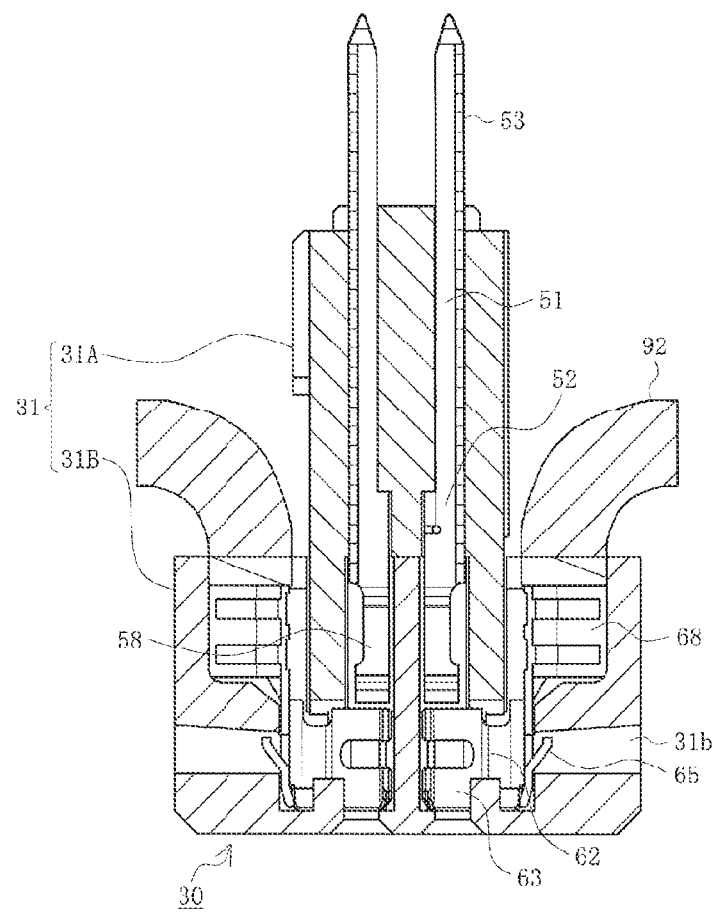

In addition, the first terminals 61 include main body parts 62, the electric wire connecting parts 68 that are connected to the upper end of the main body parts 62, the contact parts 63 that are connected to the main body parts 62, and locking protrusions 65 that are formed on the main body parts 62. As shown in FIG. 14B, in the present embodiment, the electric wire connecting parts 68 are formed on the main body parts 62 on the opposite side from the contact parts 63, in other words, in a direction perpendicular to the mating direction of and at a position offset from the contact parts 63. In addition, all of the jumper pins 51 are long and narrow members that extend in the vertical direction (mating direction of the second connector 101 and third connector 201), and include the main body parts 52, lower contact parts 58 that are connected to the lower end of the main body parts 52, and upper contact parts 53 that extend in the upward direction from the upper end of the main body parts 52. The lower contact parts 58 contain the stowage recess part 58*a* and the long and thin contact parts 263 in the third terminals 261 of the third connector 201 are inserted and stowed in the stowage recess part 58*a* from below, making contact with the lower contact parts 58. In other words, the contact parts 263 are a so-called plug type and the lower contact parts 58 are a so-called receptacle type. Note, the contact parts 63 of the first terminals 61 that the contact parts 263 are inserted into from below are also so-called receptacles. Furthermore, the upper contact parts 53 have a long thin shape extending in the vertical direction and are inserted into and stowed in the cylinder shaped contact parts 163 of the second terminals 161 of the second connector 101 from below, making contact with the contact parts 163. In other words, the upper contact parts 53 are a so-called plug type and the contact parts 163 are a so-called receptacle type.

In a condition where the first connector 1, the second connector 101, and the third connector 201 are mated together, the upper contact parts 53 of the jumper pins 51 make contact with the contact parts 163 of the second terminals 161 of the second connector 101 positioned on the upper side, as shown in FIG. 4. In addition, the upper cushioning member 28 is interposed between the first housing 11 and the second housing 111 of the second connector 101 that is positioned above the first housing 11, functions as a sealing member that seals the gap between the first housing 11 and the second housing 111, and fully prevents intrusion of external foreign substances such as dust and the like.

In addition, the form of the first housing 11, the second housing 111, and the third housing 211 are the same in plan view, or in other words in the X-Y plane, and where the first connector 1, the second connector 101, and the third connector 201 are in a mated state, the first housing 11, the second housing 111, and the third housing 211 mutually join together, with all side surfaces becoming an integral member as a flush substantially rectangular body. Then, the first cable connecting part 18 and the second cable connecting part 118 protrude in the same direction, and the first cable 91 and the second cable 191 are connected obliquely relative to the first housing 11 and the second housing 111 in plan view, or in other words, on the X-Y plane. In other words, the first cable 91 and the second cable 191 extend obliquely relative to the long side and short side of the rectangular form of the first housing 11 and the second housing 111 on the X-Y plane.

Next, a configuration of the third connector 201 will be described in detail below.

Figure 5:
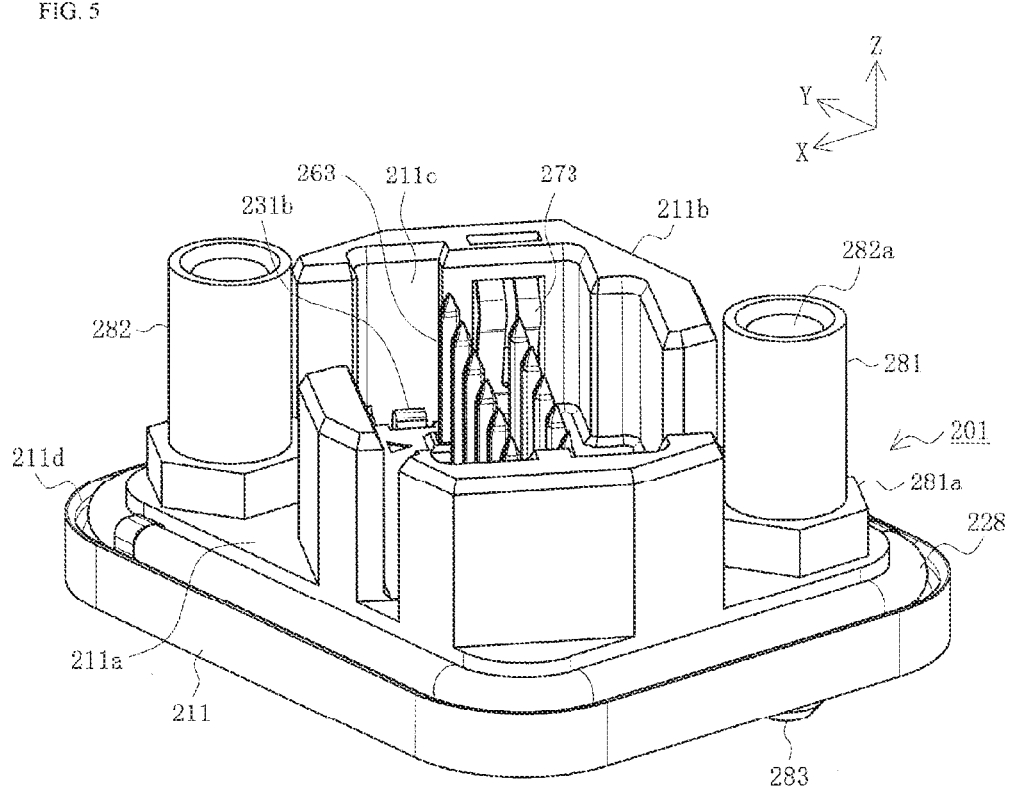
FIG. 5 is a perspective view of a third connector of the present embodiment.
Figure 6:
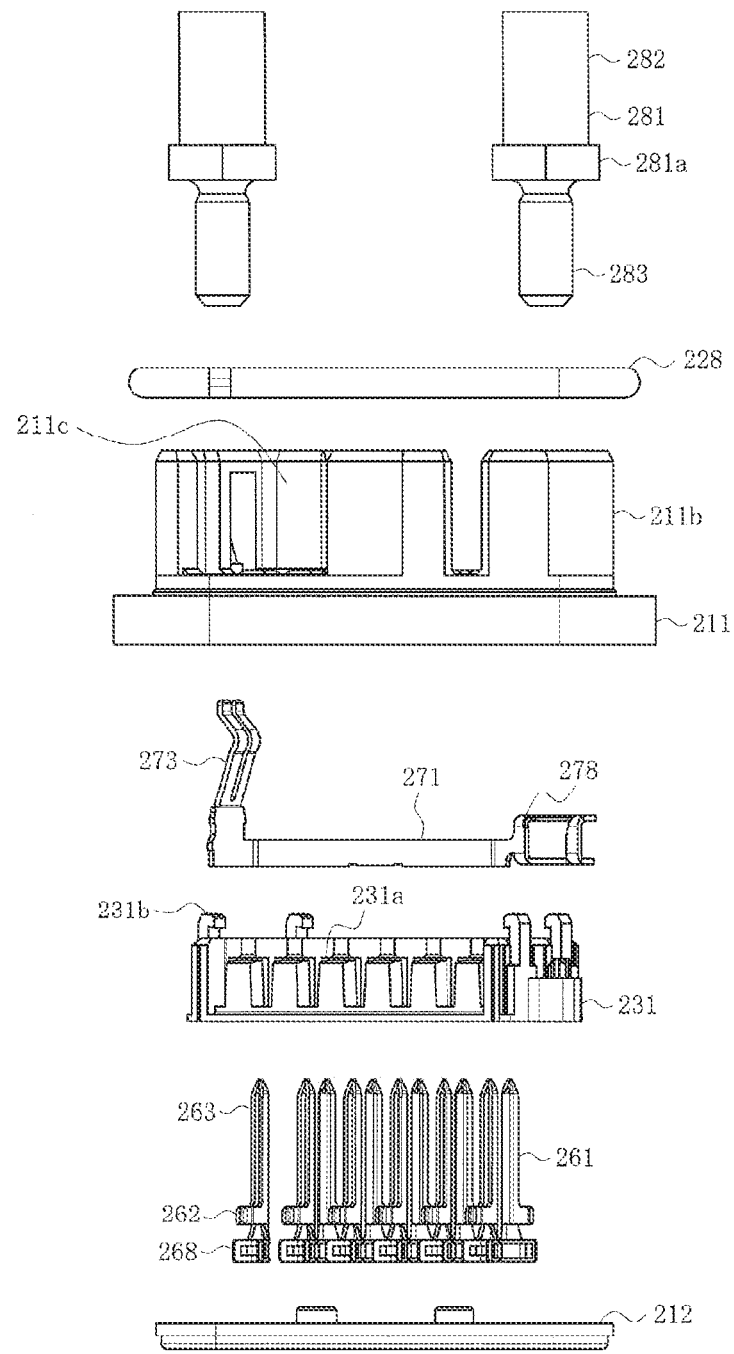
FIG. 6 is an exploded view of the third connector of the present embodiment.

FIG. 5 is a perspective view of the third connector of the present embodiment. FIG. 6 is an exploded view of the third connector of the present embodiment.

The third housing 211 of the third connector 201 includes a flat main body part 211*a*, a terminal stowage wall 211*b* that extends upwards from the top surface of the main body part 211*a*, and a seal housing groove 211*d* that is formed in a manner to surround the rim of the main body part 211*a*. The seal housing groove 211*d* stows the lower cushioning member 228, which is a substantially ring-shaped member. In addition, the interior of the terminal stowage wall 211*b* functions as a terminal stowage recess part 211*c*, and a terminal housing opening is formed on the part corresponding to the floor of the terminal housing recess part 211*c* of the main body part 211*a*.

Each of the third terminals 261 of the third connector 201 is housed and retained by each of a plurality of terminal housing parts 231*a* of a third terminal retention member 231 that is integrally formed by insulating materials such as synthetic resin and the like. Moreover, the third terminal retention member 231 is inserted in the terminal housing opening of the main body part 211*a* of the third housing 211 from the bottom side thereof, and is mounted on the main body part 211*a* by engaging of an engaging part 231*b*. Furthermore, regarding the bottom side of the third terminal retention member 231, a flexible bottom plate 212 that is integrally formed by insulating materials such as a resin that provides rubber-like flexibility and the like is mounted on the main body part 211*a*. Herewith, at least the contact parts 263 of the third terminals 261 are housed in the terminal stowage recess parts 211*c* in a state of protruding upwards from the top surface of the main body part 211*a*. As shown in FIG. 5, the contact parts 263 of the third terminals 261 form two rows, such that the rows extend obliquely towards the long side and short side of the rectangular form of the third housing 211 in an X-Y plane. Note, one end of electric wires (not shown) are connected to various types of members made up of devices such as a stepping motor stowed in the casing 291 and the other end is connected to the electric wire connecting part 268 of the third terminal 261.

In addition, a third grounding member 271, a ground member, is mounted on the third terminal retention member 231. The third grounding member 271 includes an electric wire connecting part 278 and a contact part 273 that extends upwards. One end of an electric wire (not shown) is connected to the ground terminal of various members made up of devices such as a stepping motor stowed in the casing 291 and the other end is connected to the electric wire connecting part 278. In addition, as shown in FIG. 5, the contact part 273 is exposed inside the terminal stowage recess part 211*c* from part of the inside surface of the terminal stowage wall 211*b*, with the third grounding member 271 mounted together with the third terminal retention member 231 on the main body part 211*a*.

The third mounting brackets 281 as mounting fixtures include coupling parts 282 extending upwards from the main body parts 281*a* and mounting parts 283 extending downwards from the main body part 281*a*. The coupling parts 282 are cylindrical members that are open at the upper end with female threads formed on the inner wall surface of the stowage cavities 282*a* on the inside thereof and the bottom end part of the second mounting brackets 181 are screwed into and coupled thereto. In addition, the mounting parts 283 are inserted into a penetration hole (not shown) formed in the main body part 211*a* of the third housing 211 and the bottom end parts thereof protrude below the lower surface of the main body part 211*a* and are inserted into fitting stow holes (not shown) of the casing 291. Thus, the third connector 201 is secured to the casing 291.

Next, a configuration of the second connector 101 will be described in detail below.

Figure 7:
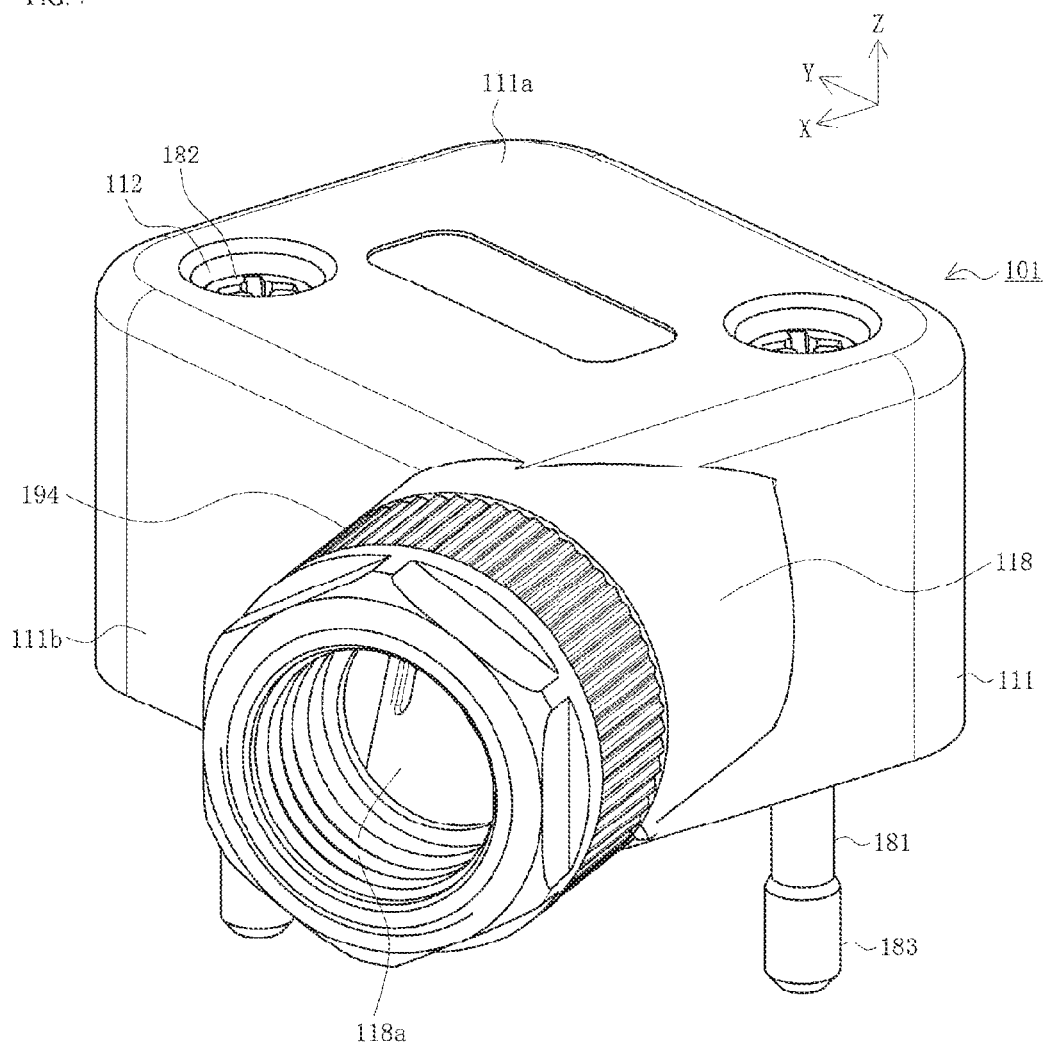
FIG. 7 is a perspective view of a second connector of the present embodiment.
Figure 8:
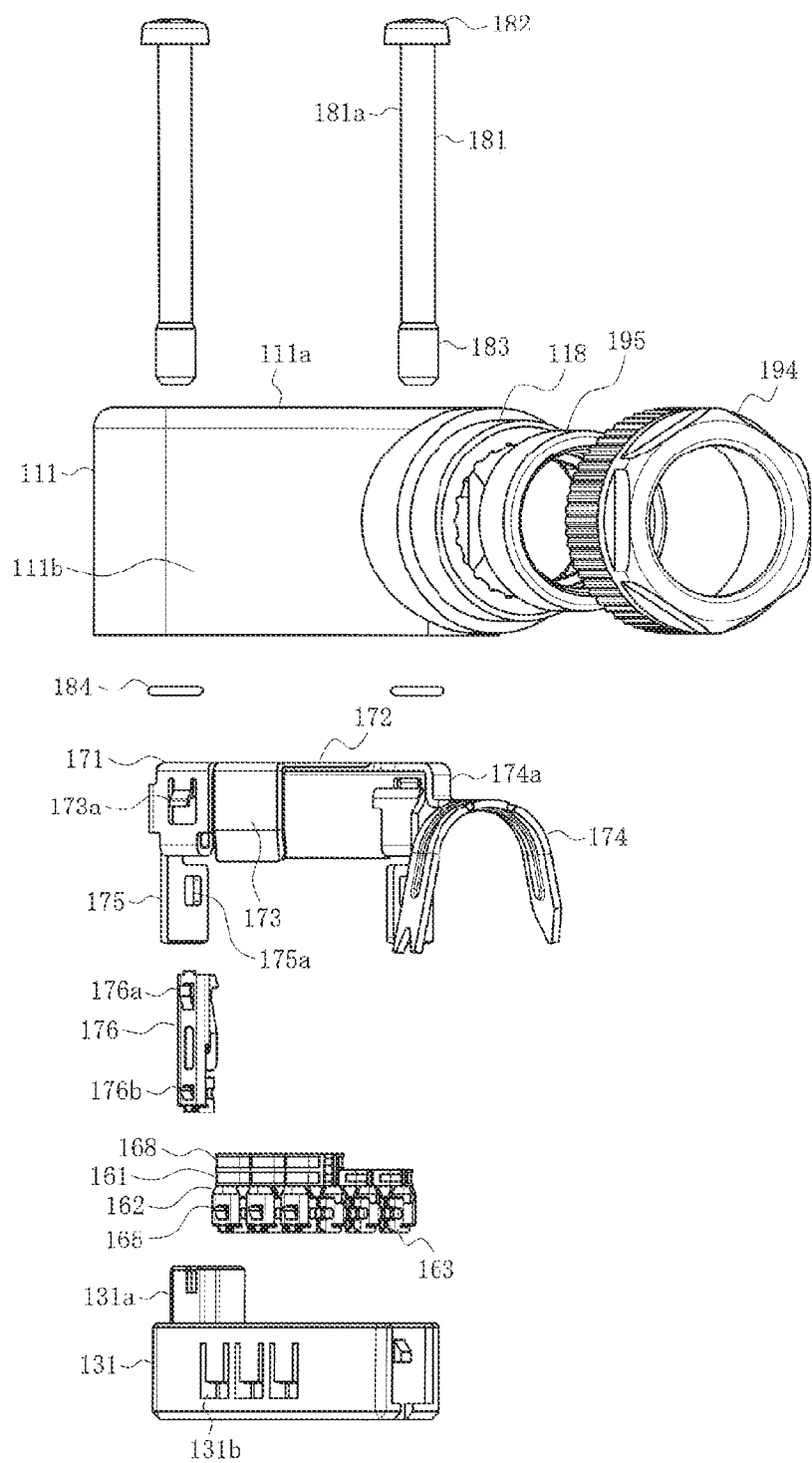
FIG. 8 is an exploded view of the second connector of the present embodiment.

FIG. 7 is a perspective view of the second connector of the present embodiment. FIG. 8 is an exploded view of the second connector of the present embodiment.

The second housing 111 of the second connector 101 includes a roughly rectangular flat plate shaped top plate 111*a* and four side walls 111*b* that extend downwards on the four sides of the top plate 111*a* rectangular shape. The bottom end thereof is a box shaped member of a roughly rectangular body where the inside is defined by the top plate 111*a* and side walls 111*b*. A mounting fixture insertion hole 112 is opened in the top plate 111*a* and goes through the second housing 111 in the vertical direction (mating direction with the first connector 1). Furthermore, the second housing 111 includes a second cable connecting part 118. The terminus of the second cable 191 is stowed inside the inner space part 118*a* of the second cable connecting part 118 and terminates the second cable connecting part 118 via a second pressing ring 194 and second bushing 195.

Furthermore, the second shield 171 as a shell of the second ground member is mounted in the cavity of the second housing 111. This second shield 171 includes a top plate 172 and side walls 173 that extend downward from at least a part of the edges of this top plate 172 and an engaging piece 173*a* for engaging with the cavity inner wall of the second housing 111 is formed on a part of the side walls 173. A connecting piece 175 is formed on the lower end of a part of the side walls 173. An engagement opening 175*a* is formed in this connecting piece 175 and an upper engaging piece 176*a* formed on the upper end of a second ground terminal 176 engages with the engagement opening 175*a* and thus the second ground terminal 176 connects to the connecting piece 175. Note, a lower engaging piece 176*b* is formed on the lower end of the second ground terminal 176. In addition, a second cable connecting piece 174 is connected to the edge of the top plate 172 via a flexible connecting piece 174*a*. Through removal of the second cable exterior coating 191*a*, the second cable connecting piece 174 is wound around and comes into contact with the exposed second cable shield 191*b* near the end of the second cable 191. Thus, the second shield 171 is shorted to the second cable shield 191*b* and reaches the same electric potential. Note, the method for wrapping the second cable connecting piece 174 on the second cable shield 191*b* is the same method of the first cable connecting piece 74 being wrapped on the first cable shield 91*b* that is described below.

Each of the second terminals 161 of the second connector 101 is stowed and retained by each of a plurality of terminal stowage parts of a second terminal retention member 131 that is integrally formed by insulating materials such as synthetic resin and the like. Note, locking recess parts 131*b* are formed on the side walls of each terminal stowage part and through the insertion and locking of locking protrusions 165 into the locking recess parts 131*b*, each of the second terminals 161 are fully retained in each terminal stowage part. In addition, a protruding part 131*a* is formed on the second terminal retention member 131. Note, the termini of each of the second electric wires 192 of the second cable 191 are inserted from above into the electric wire connecting parts 168 of each of the second terminals 161 and are connected, for example, by crimping. Furthermore, the second terminal retention member 131 is inserted into the cavity of the second housing 111 from below and mounted to the lower part of the second shield 171. Thus, the parts close to the end of the second electric wires 192 connected to the electric wire connecting parts 168 of the second terminals 161 are stowed inside the second shield 171 as shown in FIG. 4. Note, the second terminals 161 equipped on the second housing 111 form two rows similar to the third terminals 261 of the third connector 201, and these rows extend obliquely relative to the long side and short side of the rectangular shape that is the shape of the second housing 111 in the X-Y plane. In addition, on the X-Y plane, the second terminals 161 are equipped on the second housing 111 so as to achieve point symmetry. Note, the pair of mount fitting insertion holes 112 are also formed on the second housing 111 so as to achieve point symmetry. Thus, connecting to the second terminals 161 of the second electric wires 192 of the second cable 191 is simplified. In addition, this enables size reduction of the second housing 111 and overall size reduction of the second connector 101.

As described above, the first cable connecting part 18 and second cable connecting part 118 protrude in the same direction and the first cable 91 and second cable 191 extend obliquely relative to the long side and short side of the rectangular shape that is the shape of the first housing 11 and second housing 111 in the X-Y plane. In this manner, the rows of the first terminals 61 of the first connector 1 and second terminals 161 of the second connector 101 extend obliquely relative to the long side and short side of the rectangular shape that is the shape of the first housing 11 and second housing 111. Through forming of the first cable connecting part 18 and second cable connecting part 118 in an oblique direction including one corner of a diamond, wiring can be processed in the extension direction of the first cable 91 or second cable 191, simplifying wire processing and improving ease of assembly.

The second mounting brackets 181 are one type of screw member including a head 182 formed on the upper end of a main body part 181a and coupling parts 183 that extend downward from the main body part 181a. The head 182 is a part where a recess part is formed on the upper end with a + shape or − shape for engaging with a screwdriver, and is stowed in the mount fitting insertion holes 112, in a state with the second mounting brackets 181 inserted into the mount fitting insertion holes 112. In addition, the coupling parts 183 have male threads formed on the outer wall surface thereof, and are screwed into the stowage cavities 282a of the third mounting brackets 281, in a state protruding downward from the bottom end of the second housing 111 with the second mounting brackets 181 inserted into the mount fitting insertion holes 112. Note, with the second mounting brackets 181 inserted into the mount fitting insertion holes 112, an O-ring 184 is mounted from below onto the main body part 181a and thus the second mounting brackets 181 are mounted on the second housing 111.

Next, the configuration of the first connector 1 will be described below in detail.

Figure 9:
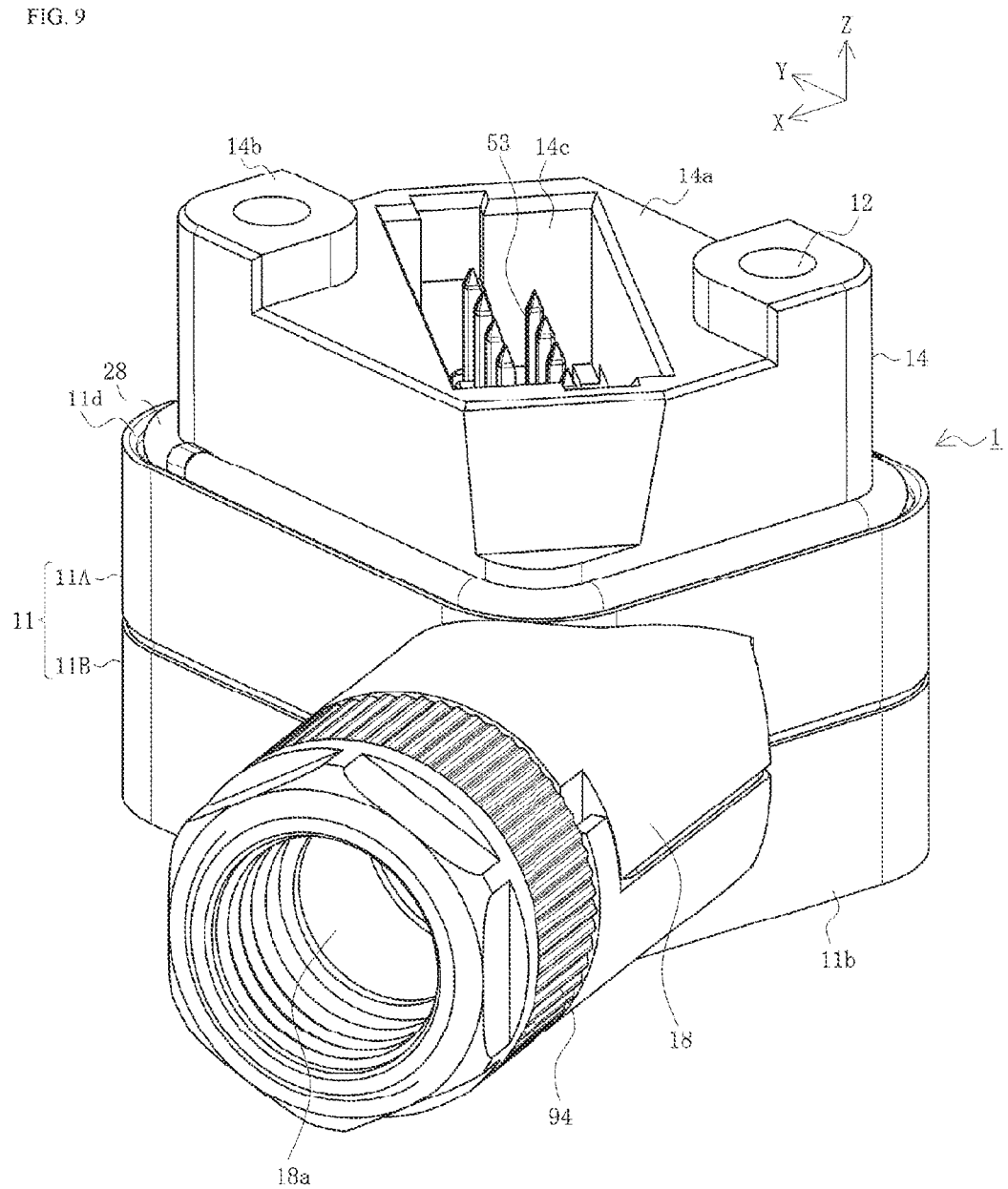
FIG. 9 is a perspective view of the first connector of the present embodiment.
Figure 10:
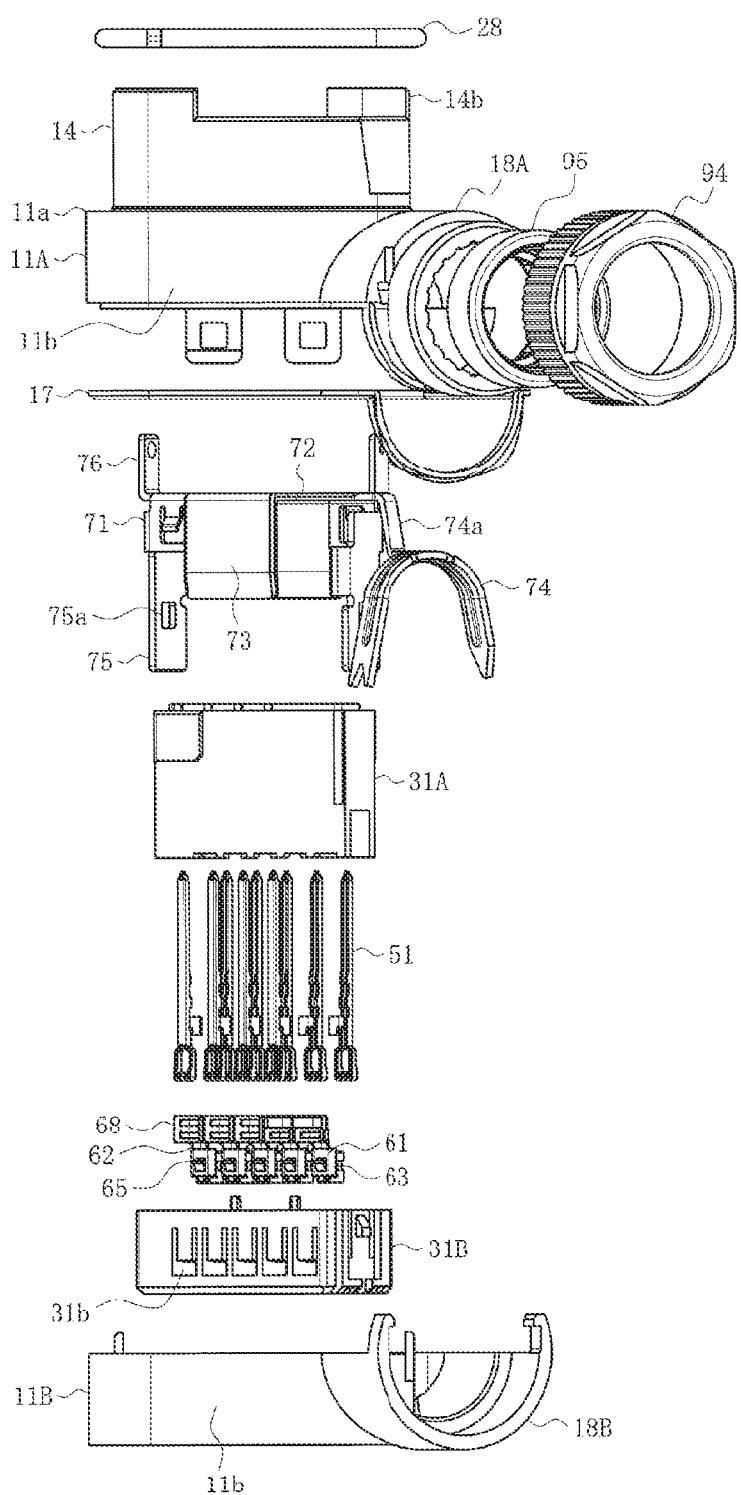
FIG. 10 is an exploded view of the first connector of the present embodiment.
Figure 11:
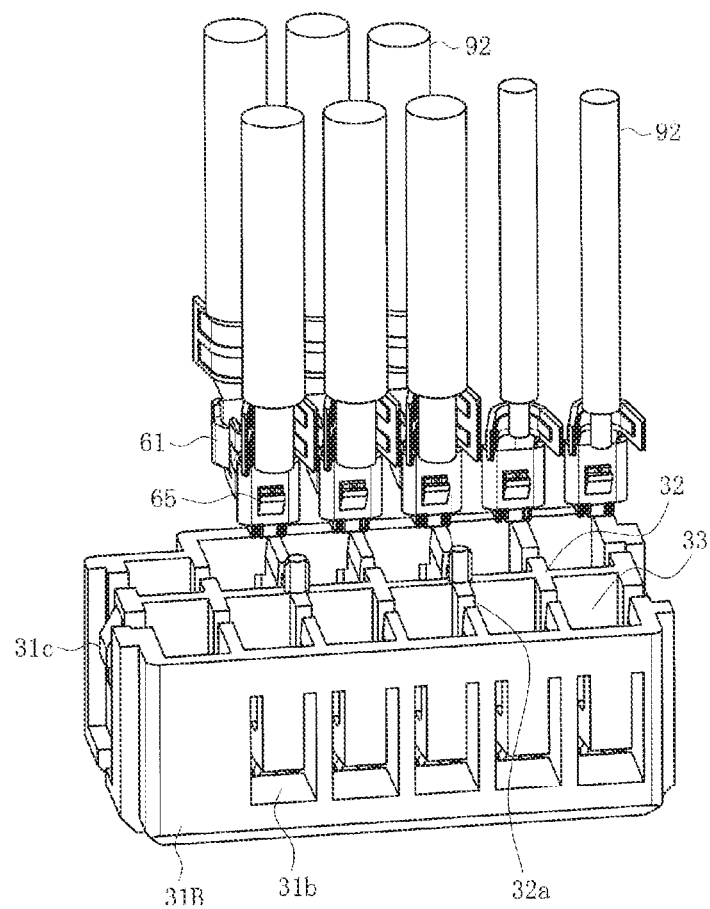
FIG. 11 is a perspective view of a lower half of a first terminal retention member of the first connector of the present embodiment right before retention of the first terminal.
Figure 12:
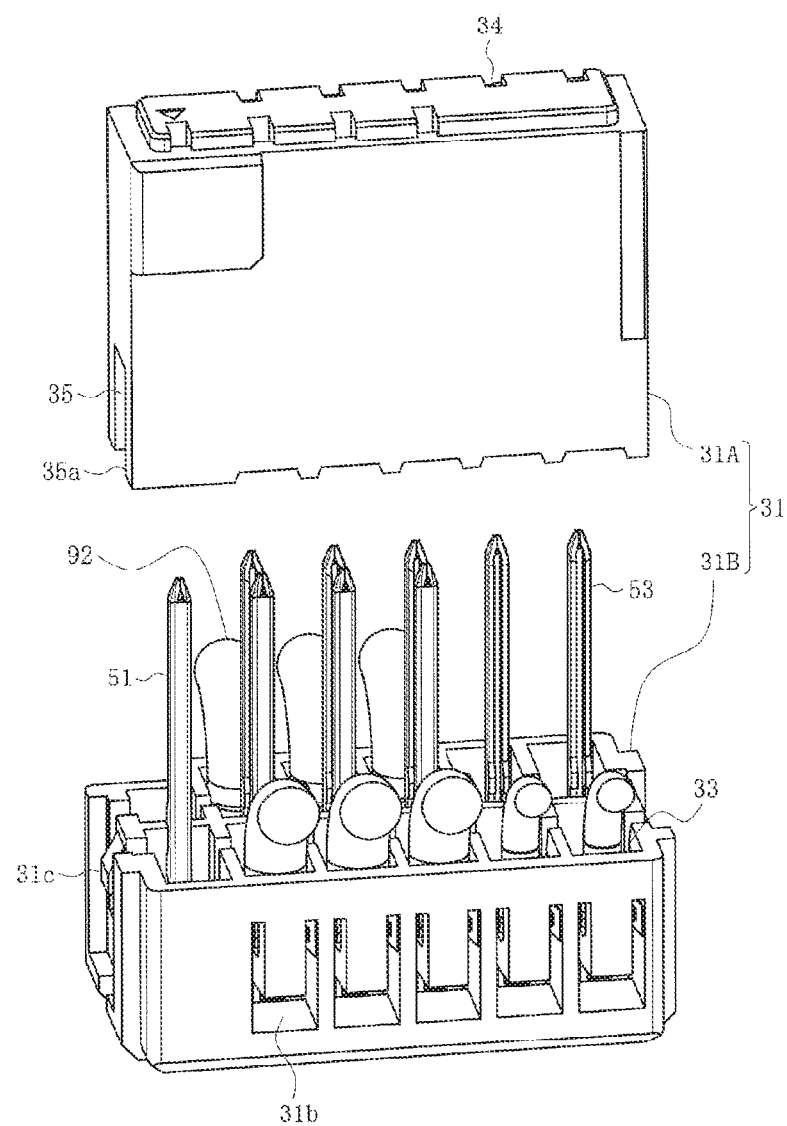
FIG. 12 is a perspective view of the lower half of the first terminal retention member retaining the first terminal and a jumper pin of the first connector of the present embodiment right before mating with an upper half.
Figure 13A:
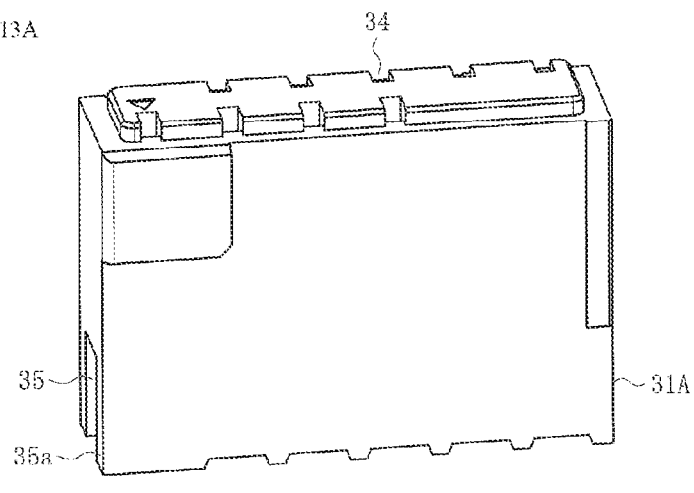
FIGS. 13A and 13B are a perspective view showing the first connector jumper pin of the present embodiment and the upper half of the first terminal retention member, where
Figure 13B:
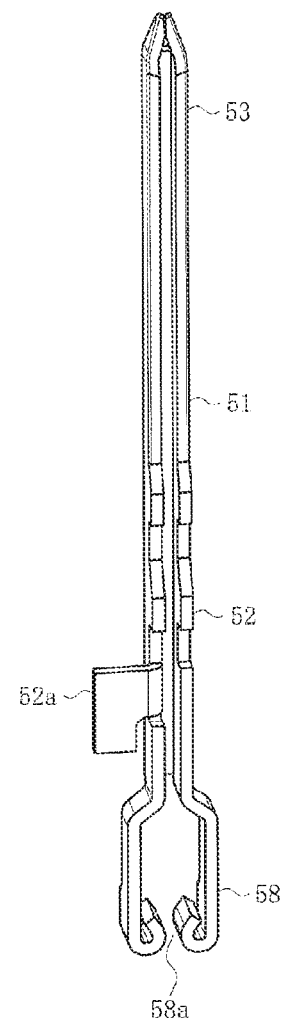
Figure 15:
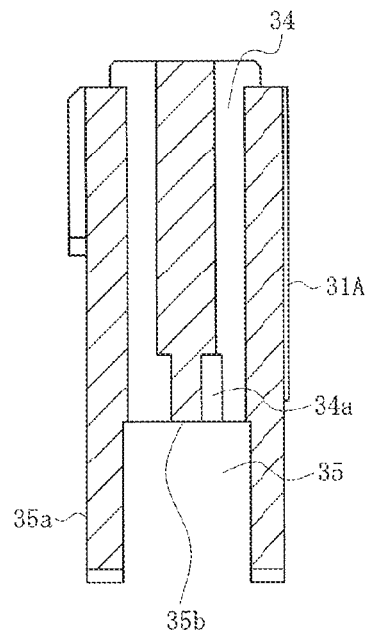
FIG. 15 is a cross-section view of the lower half of the first terminal retention member of the first connector terminal jumper pin assembly of the present embodiment right before joining with the upper half.
Figure 15:
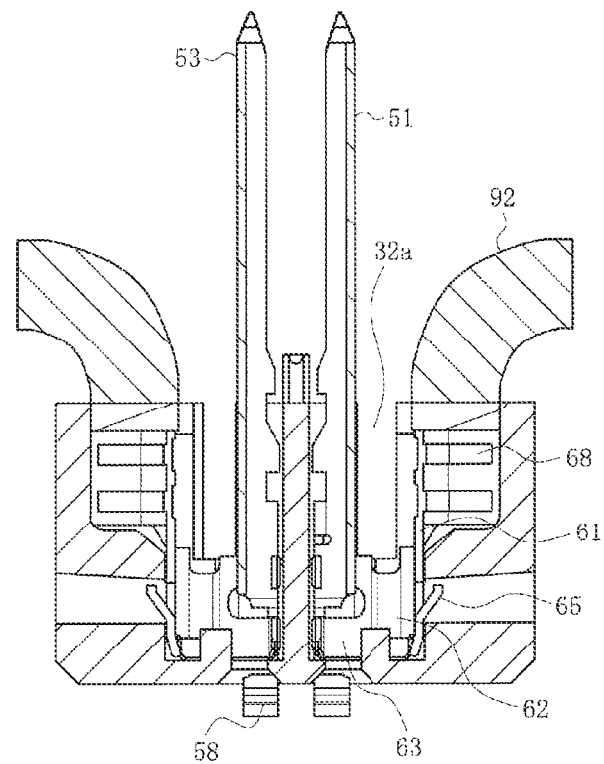
Figure 17:
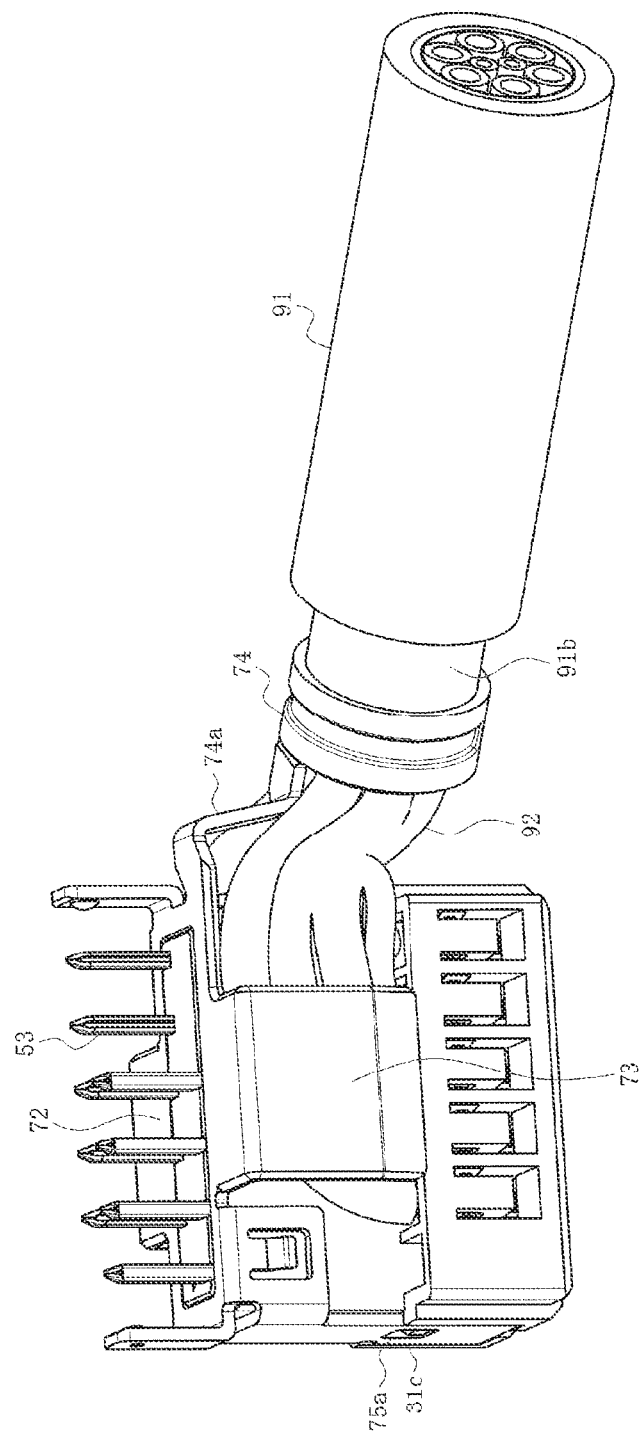
FIG. 17 is a perspective view of the first connector jumper pin assembly of the present embodiment joined with the first shield.
Figure 18:
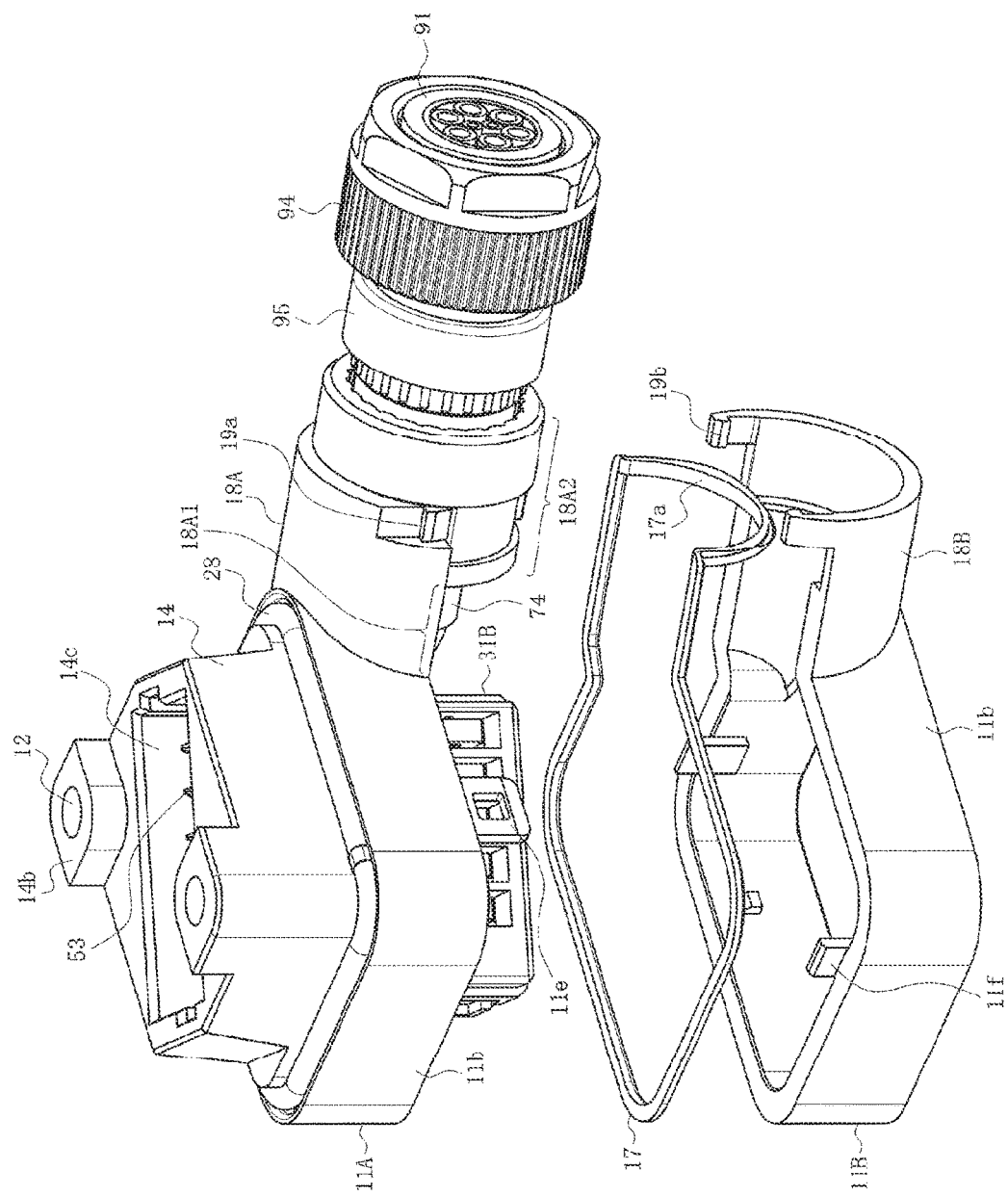
FIG. 18 is a perspective view of the first connector of the present embodiment with the lower half of the first housing removed.
Figure 19:
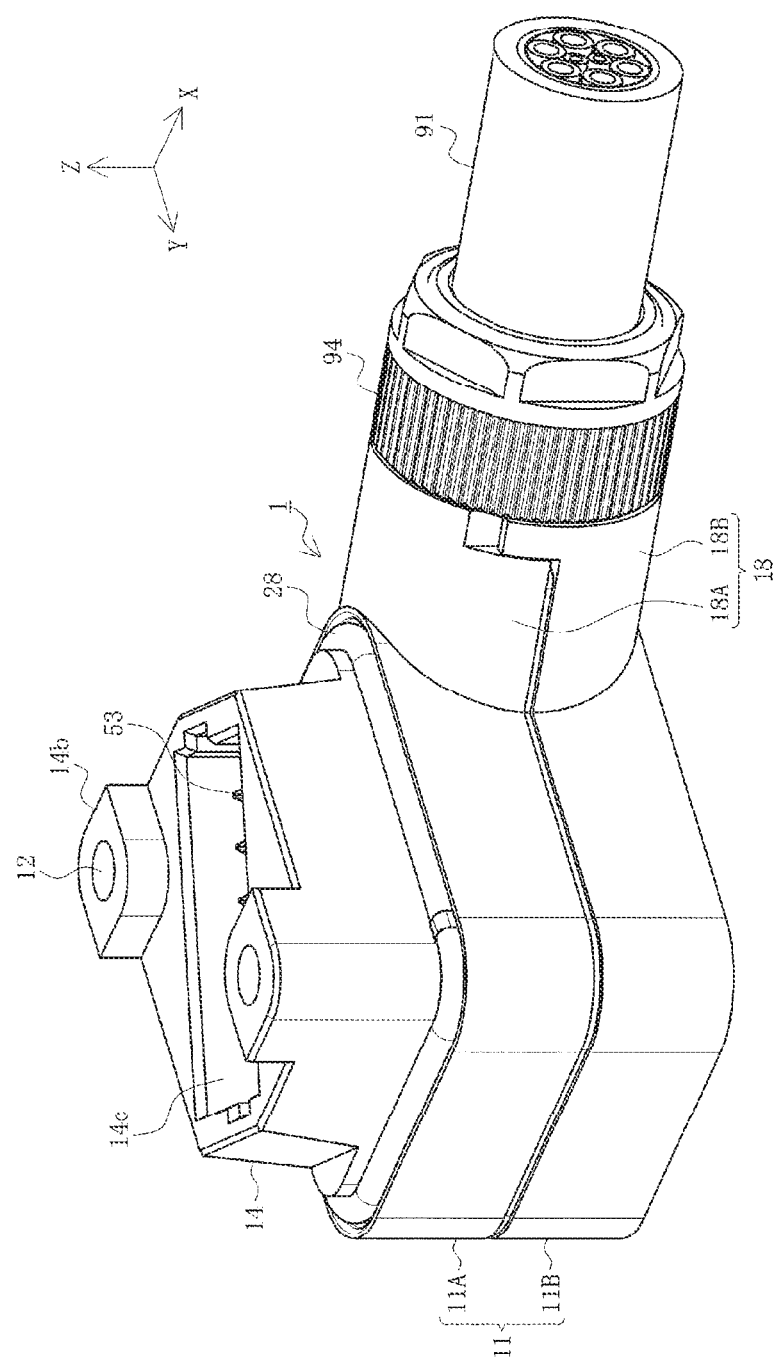
FIG. 19 is another perspective view of the first connector of the present embodiment.

FIG. 9 is a perspective view of the first connector in the present embodiment. FIG. 10 is an exploded view of the first connector in the present embodiment. FIG. 11 is a perspective view of just prior to the first terminal being retained in the lower half of the first terminal retention member of the first connector in the present embodiment. FIG. 12 is a perspective view just prior to the upper half of the first terminal of the first connector being joined to the lower half of the first terminal retention member in the present embodiment. FIGS. 13A and 13B are perspective views showing a jumper pin of the first connector and the upper half of the first terminal retention member in the present embodiment. FIGS. 14A and 14B are two drawings of a terminal jumper pin assembly of the first connector in the present embodiment. FIG. 15 is a cross-sectional view immediately before the upper half is coupled to the lower half of the first terminal retention member of the terminal jumper pin assembly of the first connector in the present embodiment. 16 is a perspective view of the first connector of the present embodiment just prior to the first shield being coupled with the terminal jumper pin assembly. FIG. 17 is a perspective view of connector 1 in the present embodiment in a state in which the first shield is coupled to the terminal jumper pin assembly. FIG. 18 is a perspective view in a state in which the lower half of the first housing is removed from the first connector in the present embodiment. FIG. 19 is another perspective view of the first connector in the present embodiment. Note, FIG. 13A is a diagram of just prior to the upper half of the first terminal retention member being mounted on the jumper pin and FIG. 13B is a diagram showing the jumper pin. In FIG. 14A is a plan view and FIG. 14B is a cross-section view along line B-B in FIG. 14A.

The first housing 11 of the first connector 1 is made up of a first housing upper part 11A that is the upper half and a first housing lower part 11B that is the lower half. When the first housing upper part 11A and first housing lower part 11B are described in an overall manner, both are described as first housing 11. Moreover, the first housing upper part 11A includes a main body part 11a, a terminal stowage protruding part 14 extending upwards from the top surface of the main body part 11a, and a seal stowage groove 11d formed surrounding the peripheral edge of the main body part 11a. The seal stowage groove 11d stows an upper cushioning member 28, which is a substantially ring-shaped member. In addition, the main body part 11a includes four side walls 11b that extend downwards from the peripheral edge thereof, and is a substantially rectangular box shaped member with a bottom end that is open. The inside thereof is a cavity with a periphery defined by the terminal stowage protruding part 14 and side walls 11b.

In addition, the terminal stowage protruding part 14 includes a flat upper surface 14a, and an upper protruding part 14b that protrudes upward from the upper surface 14a. Mounting fitting penetration holes 12 that pass through the first housing upper part 11A in a vertical direction are formed in this upper protrusion part 14b. In addition, a terminal stowage recess part 14c that passes through the first housing upper part 11A in a vertical direction is formed in the center part of the terminal stowage protruding part 14. Furthermore, the first housing upper part 11A includes a first cable connecting upper part 18A that is the upper half of the first cable connecting part 18.

Also, the first housing lower part 11B includes the same side walls 11b as the side walls 11b of the main body part 11a of the first housing upper part 11A and is a substantially rectangular box shaped member with both upper and lower ends open, and the inside thereof is a cavity defined by the periphery of the side walls 11b. In addition, first housing lower part 11B includes a first cable connecting lower part 18B that is the lower half of the first cable connecting part 18. When describing the first cable connecting upper part 18A and first cable connecting lower part 18B in an overall manner, both are described as first cable connecting part 18. The terminus of the first cable 91 is stowed inside the inner space part 18a of the first cable connecting part 18 and terminates the first cable connecting part 18 via a first pressing ring 94 and first bushing 95.

In addition, as shown in FIG. 18, the first cable connecting upper part 18A includes an upper cover 18A1 that opens downward and is formed with a cross section in a semi-circular shape and a ring shaped part 18A2 that is a cylinder with a closed ring shaped cross section formed on the tip thereof. A lock part 19a is formed close to the center in the cable extension direction of this ring shaped part 18A2. Also, at the lower part of the ring shaped part 18A2 closer to the main body than the lock part 19a, a part of the first cable connecting lower part 18B that is closer to the main body than the lock tab 19b overlaps with the lower part of the ring shaped part 18A2 and an arc part 17a of the flexible intermediate member 17 is held between and seals this overlapped part. Furthermore, the terminal jumper pin assembly 30 with an assembled first shield 71 is assembled from below to a first housing upper part 11A. Here, the first cable connecting piece 74 of the first shield 71 is arranged in the open bottom position of the upper cover 18A1.

Thus, the terminal jumper pin assembly 30 with a first shield 71 can be easily equipped on the first housing upper part 11A while laying the cable for relaying. This dramatically improves ease of assembly in addition to enabling a relay connector that ensures close adherence.

The first terminal retention member 31 that retains the first terminals 61 of the first connector 1 is made up of a first terminal retention upper member 31A that is the upper half and a first terminal retention lower member 31B that is the lower half. When describing the first terminal retention upper member 31A and first terminal retention lower member 31B in an overall manner, both are described as a first terminal retention member 31. Note, the first terminal retention upper member 31A functions as a connecting terminal retention part that retains the jumper pins 51 and first terminal retention lower member 31B functions as a terminal retention part that retains the first terminal 61.

As shown in FIG. 11, the first terminal retention lower member 31B is a substantially rectangular box shaped member integrally formed of an insulating material such as a synthetic resin and open at both top and bottom ends with the inside divided by partition walls 32 forming a plurality of terminal stowage parts 33. Note, a recess part 32a is formed as a downward cutaway of a part of the partition walls 32. In addition, locking recess parts 31b are formed on the side wall of the first terminal retention lower member 31B in a position corresponding to the terminal stowage parts 33. Furthermore, through crimping the electric wire connecting parts 68 onto the terminal ends of the first electric wires 92 of the first cable 91, each of the connected first terminals 61 are inserted from above into the plurality of terminal stowage parts 33 and by insertion of the locking protrusions 65 into the locking recess parts 31b, are reliably retained in each of the terminal stowage parts 33. In addition, engaging protrusions 31c that protrude towards the outside are formed on a part of the side walls of the first terminal retention lower member 31B.

Note, in the example shown in FIGS. 11 and 12, some of the first electric wires 92 (two wires in the example shown in the diagrams) have a narrower diameter of wire than the others. In this example, a case where the first electric wires 92 with a large diameter are used as electric power lines for supplying electric power to each part of the device 290 and the first electric wires 92 with a small diameter are used as signal lines for transmitting and receiving signals with each part of the devices 290 is being shown, however, there is no necessity of being limited to this example and the number of first electric wires 92 used as electric power lines and the number of first electric wires 92 used as signal lines can be changed as appropriate. For example, all of the first electric wires 92 can be set as electric power lines or all of the first electric wires 92 can be set as signal lines. In addition, the diameter of first electric wires 92 used for electric power lines and the diameter of first electric wires 92 used as signal lines can be set equal. Furthermore, in this example, the size of the first terminals 61 connected by the first electric wires 92 with a small diameter is set smaller than the size of the first terminals 61 for connecting the first electric wires 92 with a larger diameter, however, there is no necessity of being limited to this example and the size of all first terminals 61 can be set equal.

In addition, with the first terminals 61 that are stowed in the terminal stowage parts 33, parts close to the bottom of the main body parts 52 of the jumper pins 51 are also stowed, and therefore the first terminals 61 and jumper pins 51 are present together in the terminal stowage parts 33. Note, in the example shown in FIG. 12, there are three jumper pins 51 that are not stowed present together with the first terminals 61 in terminal stowage parts 33 where the first terminals 61 are not stowed, and one of these jumper pins 51 is for ground and the two arranged opposite the first electric wires 92 with a small diameter are for signal lines separate from these first electric wires 92. These jumper pins 51 that are not present together with first terminals 61 can be omitted as appropriate.

As shown in FIGS. 12 to 15, the first terminal retention upper member 31A is a substantially rectangular box shaped member integrally formed of an insulating material such as synthetic resin and the inside thereof has a recess groove 35 formed upwards by cutting away from the lower surface. In addition, jumper pin insertion holes 34 are formed extending in the vertical direction at a position corresponding to each of the jumper pins 51 stowed in the terminal stowage parts 33 of the first terminal retention lower member 31B. The jumper pin insertion holes 34 penetrate from the upper surface of the first terminal retention upper member 31A to the top surface 35b of the recess groove 35. In addition, engaging recess parts 34a that engaging pieces 52a protruding sideways from the main body parts 52 of the jumper pins 51 can be inserted into and engage with are formed on the bottom end of the jumper pin insertion holes 34. Note, the part of the side wall of the first terminal retention upper member 31A corresponding to the recess groove 35 functions as an insertion part 35a that is inserted into the recess part 32a formed on a partition wall 32 of the first terminal retention lower member 31B.

As shown in FIG. 15, the first terminal retention upper member 31A is oriented above the first terminal retention lower member 31B with the jumper pins 51 and first terminals 61 connected to the first electric wires 92 stowed therein and then lowered relative thereto, and is integrated with the first terminal retention lower member 31B as shown in FIG. 14B. Here, the insertion part 35a of the first terminal retention upper member 31A is inserted into the recess part 32a corresponding to the first terminal retention lower member 31B, the top surface 35b of the recess groove 35 of the first terminal retention upper member 31A comes into contact with the partition walls 32 of the first terminal retention lower member 31B, and each of the jumper pins 51 are inserted into the corresponding jumper pin insertion holes 34. Thus, the terminal jumper pin assembly 30 shown in FIGS. 14A and 14B can be obtained. Note, each of the jumper pins 51 are moved further upwards than the state prior to assembly of the first terminal retention upper member 31A to the first terminal retention lower member 31B, the overall main body parts 52 are positioned inside the jumper pin insertion holes 34, the engaging pieces 52a protruding sideways from the main body parts 52 are inserted into the engaging recess parts 34a of the jumper pin insertion holes 34, the lower contact parts 58 included with the stowage recess parts 58a are positioned above the contact parts 63 of the first terminals 61, and a part including at least the tip of the upper contact parts 53 protrude above the top surface of the first terminal retention upper member 31A.

Note, the first terminal retention upper member 31A and jumper pins 51 can be integrated and set as a jumper pin assembly. For example, a first terminal retention upper member 31A with jumper pins 51 integrated internally can be obtained using an insert mold (over molding) or jumper pins 51 can be press-fit secured into the first terminal retention upper member 31A beforehand.

Figure 16:
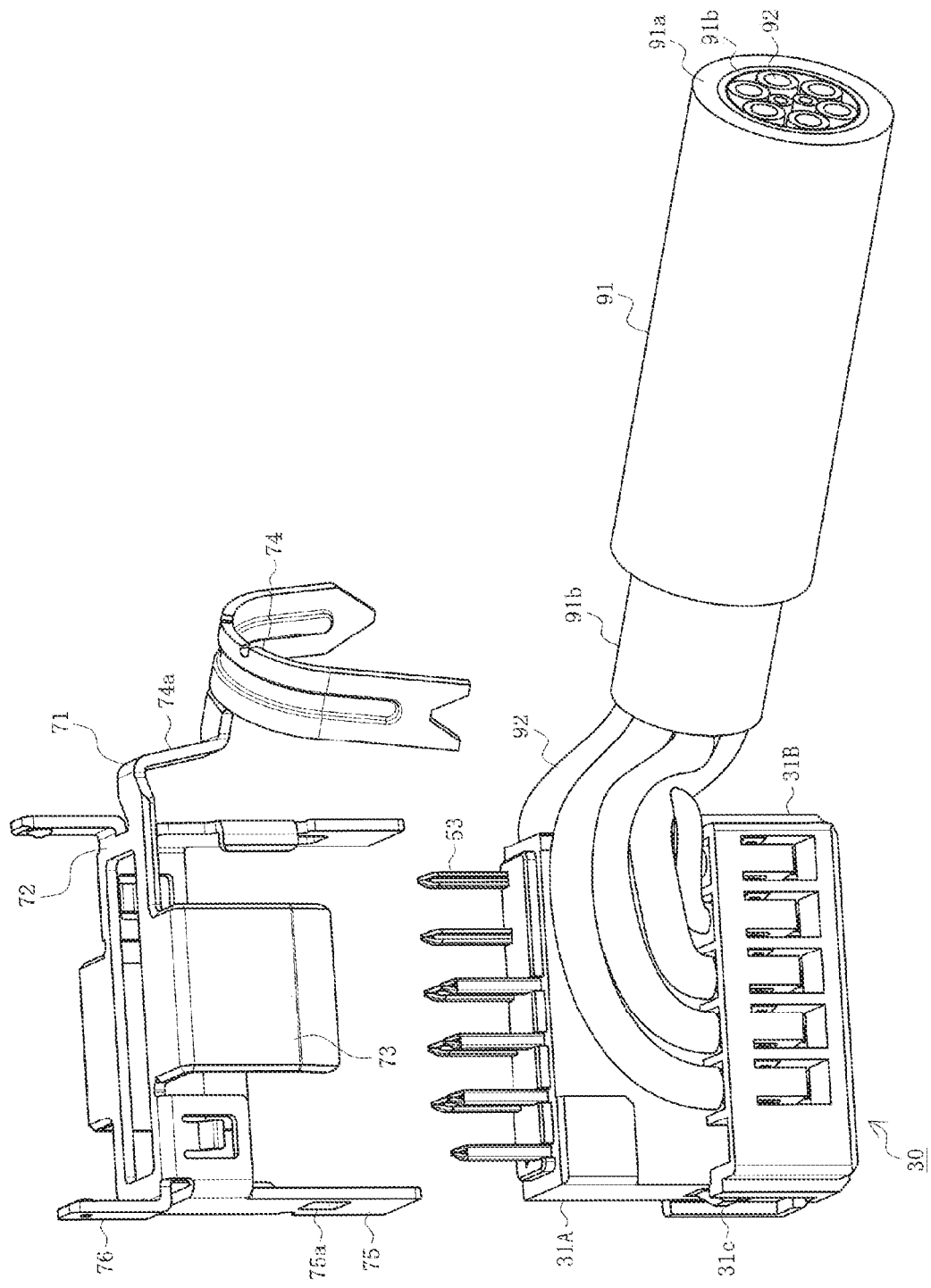
FIG. 16 is a perspective view of the first connector terminal jumper pin assembly of the present embodiment right before a first shield is joined thereto.

As shown in FIGS. 16 and 17, the first shield 71 is mounted to the terminal jumper pin assembly 30 as a shell that is a first ground member. The first shield 71 includes a top plate 72 and side walls 73 that extend downwards from at least a part of the edge of the top plate 72 and lower connecting pieces 75 are formed extending downward from the bottom edge of a part of these side walls 73. Engaging openings 75a are formed in these lower connecting pieces 75 and through engaging of the engaging protrusions 31c formed in a part of the side walls of the first terminal retention lower member 31B in the engaging openings 75a, the lower connecting pieces 75 are engaged to the terminal jumper pin assembly 30. In addition to the upper connecting piece 76 that extends upwards connecting to the edge of the top plate 72, the first cable connecting piece 74 is also connected thereto via a flexible connecting piece 74a. As shown in FIG. 17, the first cable connecting piece 74 is wound around and makes contact with the first cable shield 91b exposed through removal of the first cable exterior coating 91a near the terminal end of the first cable 91. Thus, the first shield 71 is shorted to the first cable shield 91b and reaches the same electric potential. In addition, as described above, the electric wire connecting parts 68 of the first terminals 61 are formed on the opposite side of the contact parts 63 and the first electric wires 92 are crimped to the electric wire connecting parts 68 in parallel with the mating direction, and therefore, as shown in FIGS. 16 and 17, the first electric wires 92 can be laid on the side surface of the first terminal retention upper member 31A, in other words, along the side of the upper contact parts 53 of the jumper pins 51 such that laying of the first electric wires 92 is easily performed and dimensions in the width direction can be suppressed.

Furthermore, as shown in FIG. 17, the terminal jumper pin assembly 30 with a first shield 71 mounted is insert mounted from below into the cavity of the first housing upper part 11A. In this case, the first cable connecting piece 74 wound on the first shield 71 and first cable shield 91b is connected via the flexible connecting piece 74a so the terminal jumper pin assembly 30 can easily be mounted on the first housing upper part 11A. Thus, as shown in FIG. 18, the part near the terminal end of the first cable 91 is stowed in the first cable connecting upper part 18A and the part near the terminal end of the upper contact parts 53 of the jumper pins 51 are stowed in the terminal stowage recess part 14c.

Furthermore, the upper end of the first housing lower part 11B is mounted on the lower end of the first housing upper part 11A via the flexible intermediate member 17 integrally formed using insulating materials such as resin and the like, that provide a rubber like elasticity. Here, as an upper side insertion guide 11e that protrudes downward from the lower end of the first housing upper part 11A is inserted inside the side walls 11b of the first housing lower part 11B, and a lower side insertion guide 11f that protrudes upward from the upper end of the first housing lower part 11B is inserted inside the side walls 11b of the first housing upper part 11A, the first housing lower part 11B can be simple and reliably mounted on the first housing upper part 11A. In addition, as the lock tab 19b formed on the first cable connecting lower part 18B and the lock part 19a formed on the first cable connecting upper part 18A engage, separation of the first housing upper part 11A and the first housing lower part 11B is prevented.

Thus, as shown in FIG. 19, the first connector 1 can be obtained. Note, similar to the second terminals 161 of the second connector 101 and the third terminals 261 of the third connector 201, the first terminals 61 equipped on the first housing 11 are formed in two rows and these rows extend obliquely relative to the long side and short side of the rectangular shape that is the shape of the first housing 11 in the X-Y plane. In addition, on the X-Y plane the first terminals 61 are equipped on the first housing 11 in such a way as to achieve point symmetry. Note, the pair of mounting fitting penetration holes 12 are also formed on the first housing 11 so as to achieve point symmetry. Thus, simplifying connecting to the first terminals 61 of the first electric wires 92 of the first cable 91. In addition, this enables size reduction of the first housing 11 and overall size reduction of the first connector 1. In this manner, the rows of the first terminals 61 of the first connector 1 and second terminals 161 of the second connector 101 extend obliquely relative to the long side and short side of the rectangular shape that is the shape of the first housing 11 and second housing 111. Through forming of the first cable connecting part 18 and second cable connecting part 118 in an oblique direction including one corner of a diagonal, wiring can be processed in the extension direction of the first cable 91 or second cable 191, simplifying wire processing and improving ease of assembly.

Next is a description of a modified example of the first terminals 61 and the jumper pins 51 of the first connector 1.

Figure 20A:
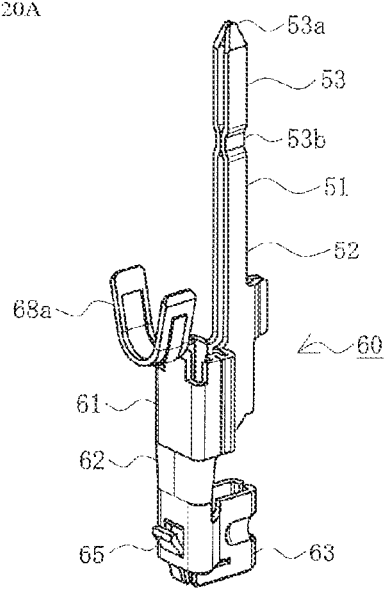
FIGS. 20A, 20B and 20C are three views showing relay terminals of the first connector in the present embodiment, where
Figure 20B:
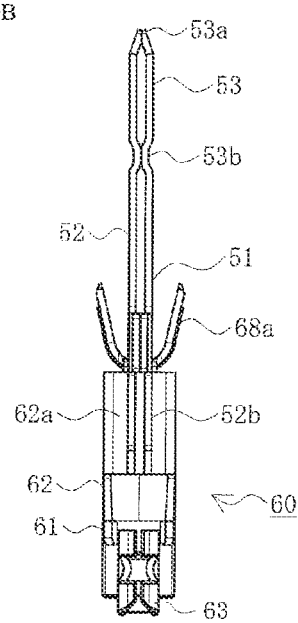
Figure 20C:
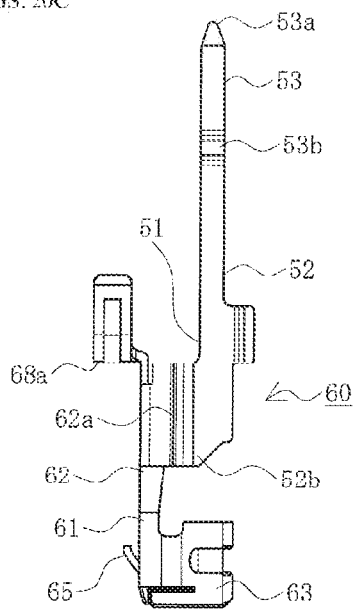
Figure 21:
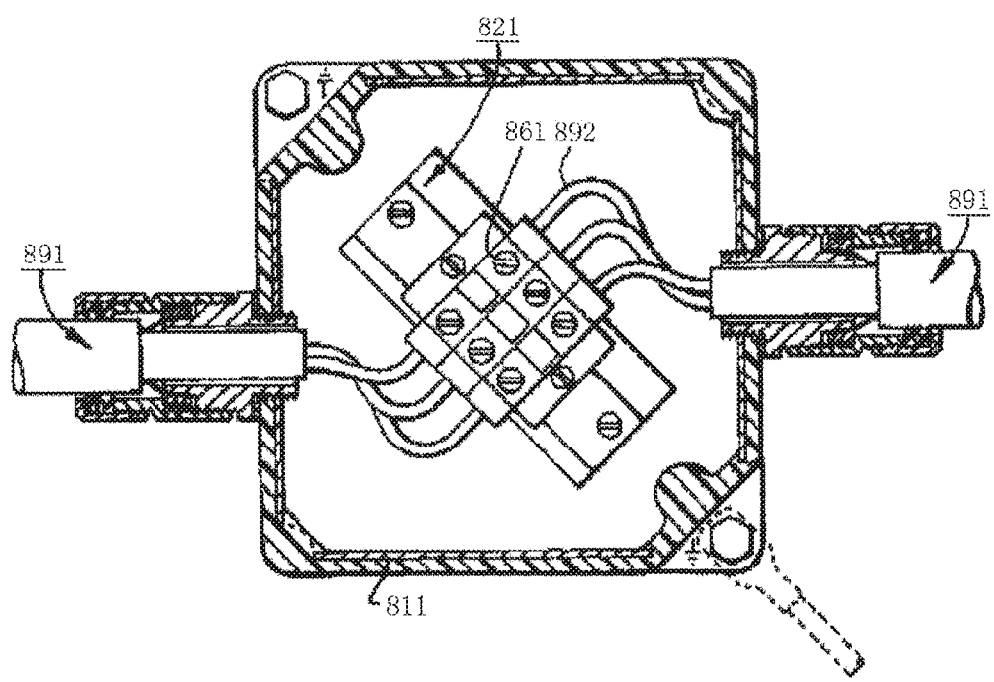
FIG. 21 is a cross-sectional drawing showing the inside of a conventional connecting device.

FIGS. 20A, 20B and 20C are three views showing the relay terminal of the first connector of the present embodiment. Note that in the drawing, FIG. 20A is a perspective view, FIG. 20B is a front view, and FIG. 20C is a side view.

The first connector 1 in the present embodiment can provide relay terminals 60 of the first terminals 61 and the jumper pins 51 integrated together in exchange of the first terminals 61 and the jumper pins 51, as shown in FIG. 20. With the relay terminals 60, the main body parts 62 of the first terminals 61 include terminal coupling pieces 62a, electric wire connecting parts 68 are linked on the upper end of the main body parts 62, and pin coupling pieces 52b are formed on the lower end of the main body parts 52 of the jumper pins 51 as coupling parts. Furthermore, the terminal coupling pieces 62a and pin coupling pieces 52b are integrally bonded and thus the first terminals 61 and jumper pins 51 are integrated together. In addition, as is clear from FIG. 20A, the first electric wires 92 crimped onto the electric wire connecting parts 68 extend at an angle relative to the mating direction. Therefore, the first electric wires 92 can be crimped to the upper contact parts 53 of the jumper pins 51 and the first terminals 61 in a position that is a distance away, simplifying the crimp operation.

As shown in FIG. 20, the center axes of the cylindrical shaped contact parts 63 of the first terminals 61 that extend in the vertical direction mutually match the center axes of the main body parts 52 of the jumper pins 51 that extend in the vertical direction, in other words, both are on the same straight line. Therefore, the center axes of the contact parts 263 of the third terminals 261 that are inserted into the cylindrical shaped contact parts 63 and make contact with these contact parts 63 and extend in the vertical direction also match the center axes of the main body parts 52 of the jumper pins 51.

In addition, the upper end and lower end of the upper contact parts 53 of the main body parts 52 of the jumper pins 51 have a first butt joint 53a and second butt joint 53b formed as a butt joint. Thus, the narrow long members on the left and right (left side and right side in FIG. 20) that makeB up the main body parts 52 mutually connect so if the upper contact parts 53 come into contact with the contact parts 163 of the second terminals 161 of the second connector 101, deformation due a push on these contact parts 163 from the left or the right occurs less readily, enabling maintaining contact pressure with these contact parts 163.

Note, regarding the relay terminals 60, the engaging pieces 52a and lower contact parts 58 of the jumper pins 51 are omitted.

Next, the connection state of the first terminals 61, the second terminals 161, and the third terminals 261 will be described for the state where the first connector 1, the second connector 101, and the third connector 201 are mated together.

When the first connector 1 is mated with the third connector 201 mounted on the casing 291 of the device 290, the bottom end of the first housing lower part 11B presses the lower cushioning member 228 from the top, which is stowed in the seal housing groove 211d that surrounds the peripheral edge of the main body part 211a of the third housing 211, the first terminal retention lower member 31B is inserted into the terminal stowage recess part 211c of the third housing 211 from the top, and the contact parts 263 of the third terminals 261 move upwards in a relative manner, make contact with the contact parts 63 of the first terminals 61, and also make contact with the lower contact parts 58 of the jumper pins 51 that are positioned higher than the contact parts 63. In addition, the contact part 273 of the third grounding member 271 also move upward in a relative manner and make contact with the lower connecting pieces 75 of the first shield 71.

Furthermore, when the second connector 101 is mated with the first connector 1, the lower end of the second housing 111 presses the upper cushioning member 28 that is stowed in the seal stowage groove 11d that surrounds the peripheral edge of the main body part 11a of the first housing upper part 11A from the top, the second terminal retention member 131 is inserted into the terminal stowage recess part 14c of the first housing upper part 11A from the top, and the upper contact parts 53 of the jumper pins 51 move up in a relative manner, making contact with the contact parts 163 of the second terminals 161. In addition, the upper connecting piece 76 of the first shield 71 also moves up in a relative manner, making contact with the connecting piece 175 of the second shield 171 via the second ground terminal 176.

Thus, the first terminals 61, second terminals 161, and third terminals 261 mutually conduct, and the first shield 71, second shield 171, and third grounding member 271 mutually conduct. Note that by screwing the coupling parts 183 of the second mounting brackets 181 into the stowage cavities 282a of the coupling parts 282 of the third mounting brackets 281, mating status of the first connector 1, the second connector 101, and the third connector 201 can be reliably maintained.

Therefore, for example, in a case where the other end of the second cable 191 with one end connected to the second connector 101 is connected to an electric power supply source (not shown) such as electrical power and the like, the electric power supplied from the electric power source is transmitted to the third terminals 261 from the second terminals 161 connected to the second electric wires 192 via the jumper pins 51 and supplies electricity to all parts of the device 290 via an electric wire (not shown) from the third terminals 261. Additionally, the electric power is transmitted to the first terminals 61 from the second terminals 161 via the jumper pins 51, and with one end connected to the first connector 1 the first cable 91 supplies electric power to other devices and the like (not shown) connected to the other end from the first terminals 61 via the first electric wires 92.

Note that several of the first electric wires 92 and the second electric wires 192 are for signal lines, and this is a case where the jumper pins 51 that make contact with the second terminals 161 connected to the second electric wires 192 for signal lines are not present together with first terminals 61 for signal lines inside the terminal stowage parts 33 of the first terminal retention lower member 31B. When the second electric wires 192 for signal lines with the other end (not shown) of the second cable 191 are connected to a signal source such as a controller and the like, the signal that is supplied from the signal source is transmitted from the second terminals 161 of the second electric wires 192 to the third terminals 261 via the jumper pins 51, and this is supplied to all controllers and the like of the device 290 from the third terminals 261 via electric wires (not shown). A signal returned from the controller and the like is transmitted from the third terminals 261 directly to the first terminals 61 for signal lines via other electric wires, and this is supplied to controllers and the like of other devices and the like connected to the other end (not shown) of the first cable 91 of which one end is connected to the first connector 1 via the first electric wires 92 for signal lines from the first terminals 61.

Therefore, for example, the device 290 provided with the first connector 1, second connector 101, and third connector 201 can be connected in a string together form or daisy-chain configuration.

In addition, the first connector 1 can be omitted where the second connector 101 is mated with the third connector 201.

In this case, when the second connector 101 is mated with the third connector 201 mounted on the casing 291 of the device 290, the lower end of the second housing 111 presses the lower cushioning member 228 stowed in the seal housing groove 211d that surrounds the peripheral edge of the main body part 211a of the third housing 211 from the top, the second terminal retention member 131 is inserted into the terminal stowage recess part 211c of the third housing 211 from the top, and the contact parts 263 of the third terminals 261 move upwards in a relative manner, making contact with the contact parts 163 of the second terminals 161. In addition, the contact part 273 of the third grounding member 271 also moves up in a relative manner, making contact via the connecting piece 175 of the second shield 171 and the second ground terminal 176. Note that shorter second mounting brackets 181 are more desirable than mating the first connector 1, second connector 101, and third connector 201.

Similar to this case, the device 290 mated with the second connector 101 and the third connector 201 cannot connect part way into the daisy chain. However, connection is possible at the end of the daisy chain using the second connector 101 and the third connector 201 that are connected part way.

In this manner, in the present embodiment, the first connector 1 can be mated with the second connector 101 and the third connector 201. Furthermore, the present embodiment includes a first housing 11, first terminals 61 equipped in the first housing 11 that can connect with third terminals 261 provided in the third connector 201, and jumper pins 51 equipped in the first housing 11 that can connect with the second terminals 161 provided in the second connector 101. The first terminals 61 include electric wire connecting parts 68 connected to the first electric wires 92 contained in the first cable 91 connected to the first housing 11 and contact parts 63 that can be connected to the third terminals 261, and the electric wire connecting parts 68 are at a position offset relative to the contact parts 63 with regards to the direction orthogonal to the mating direction.

Thus, the first connector 1 can be connected with the second connector 101 and the third connector 201, such that connecting the first electric wires 92 to device 290 is possible, and relaying is also possible, even while having a simple configuration and being small in size, thereby improving convenience. Furthermore, the position of the electric wire connecting parts 68 is offset relative to that of the contact parts 63 with regards to the direction orthogonal to the mating direction, enabling suppressing dimensions regarding the mating direction of the first connector 1, or in other words, the height.

In addition, the first terminals 61 are separate members from the jumper pins 51. Furthermore, the part of the first electric wires 92 that connect to the electric wire connecting parts 68 extend in the mating direction. Furthermore, the jumper pins 51 include upper connecting parts 53 that can be connected by insertion into the contact parts 163 of the second terminals 161 and lower connecting parts 58 that can be connected by insertion of the contact parts 263 of the third terminals 261. Furthermore, the first terminals 61 are arranged to form a row that extends in an oblique direction with regards to the first housing 11 in plan view. Furthermore, the first terminals 61 are arranged point symmetrically in plan view. Furthermore, the first terminals 61 are retained by the first terminal retention lower member 31B, and the jumper pins 51 are retained by the first terminal retention upper member 31A. Furthermore, the first terminal retention lower member 31B is arranged on the third connector 201 side of the first terminal retention upper member 31A. Furthermore, the first terminal retention lower member 31B is mounted on the first terminal retention upper member 31A. Furthermore, the first terminal retention upper member 31A is integrated with the jumper pins 51. Furthermore, the first terminal retention lower member 31B includes the first shield 71, and the first shield 71 is connected to the first cable shield 91b of the first cable 91 via the flexible connecting piece 74a.

Note that the disclosure of the present specification describes characteristics related to a preferred and exemplary embodiment. Various other embodiments, modifications, and variations within the scope and spirit of the claims appended hereto could naturally be conceived of by persons skilled in the art by summarizing the disclosures of the present specification.

The present disclosure can be applied to connectors.

The invention claimed is:

1. A connector assembly comprising:
   a first connector, the first connector having a first housing, first terminals and coupling terminals, the first terminals being equipped in the first housing, the coupling terminals being equipped in the first housing, the first housing have penetration holes extending therethrough;
   a second connector, the second connector being configured to be connected to electric wires providing signals and electric power, the second connector having a second housing and second terminals, the second terminals being equipped in the second housing, the second housing having insertion holes; and
   a third connector, the third connector having a third housing, third terminals and a mounting fixture, the third terminals being equipped in the third housing, the third connector configured to be mounted on a device via the mounting fixture;
   wherein each of the second terminals and the third terminals are configured to be connected to the coupling terminals,
   wherein the first connector is positioned between the second connector and the third connector,
   wherein the first connector divides the signals and electric power supplied from the electric wires,
   wherein the first, second and third connectors are connected to one another via screw members which extend through the insertion holes, through the penetration holes, and into the mounting fixture,
   wherein the coupling terminals comprise an upper connecting part that is configured to be connected by insertion into a contact part of the second terminal and a lower connecting part that is configured to be connected by insertion of the contact part of the third terminal.

2. A connector assembly comprising:
   a first connector, the first connector having a first housing, first terminals and coupling terminals, the first terminals being equipped in the first housing, the coupling terminals being equipped in the first housing, the first housing have penetration holes extending therethrough;
   a second connector, the second connector being configured to be connected to electric wires providing signals and electric power, the second connector having a second housing and second terminals, the second terminals being equipped in the second housing, the second housing having insertion holes; and
   a third connector, the third connector having a third housing, third terminals and a mounting fixture, the third terminals being equipped in the third housing, the third connector configured to be mounted on a device via the mounting fixture;
   wherein each of the second terminals and the third terminals are configured to be connected to the coupling terminals,
   wherein the first connector is positioned between the second connector and the third connector,
   wherein the first connector divides the signals and electric power supplied from the electric wires,
   wherein the first, second and third connectors are connected to one another via screw members which extend through the insertion holes, through the penetration holes, and into the mounting fixture,
   wherein the first housing is configured to be separated into an upper half and lower half.

3. A connector assembly comprising:
   a first connector, the first connector having a first housing, first terminals and coupling terminals, the first terminals being equipped in the first housing, the coupling terminals being equipped in the first housing, the first housing have penetration holes extending therethrough;
   a second connector, the second connector being configured to be connected to electric wires providing signals and electric power, the second connector having a second housing and second terminals, the second terminals being equipped in the second housing, the second housing having insertion holes; and
   a third connector, the third connector having a third housing, third terminals and a mounting fixture, the third terminals being equipped in the third housing, the third connector configured to be mounted on a device via the mounting fixture;
   wherein each of the second terminals and the third terminals are configured to be connected to the coupling terminals,
   wherein the first connector is positioned between the second connector and the third connector,
   wherein the first connector divides the signals and electric power supplied from the electric wires,
   wherein the first, second and third connectors are connected to one another via screw members which extend through the insertion holes, through the penetration holes, and into the mounting fixture, wherein each first terminal is connected to a first wire included in a first cable connected to the first housing, and in plan view, the first cable is connected obliquely to the first housing.

4. The connector assembly according to claim 3, wherein the first terminals are arranged forming a row extending in an oblique direction relative to the first housing in plan view.

* * * * *